(12) United States Patent
Zeller et al.

(10) Patent No.: US 12,312,942 B2
(45) Date of Patent: *May 27, 2025

(54) DRILL PLANNING TOOL FOR TOPOGRAPHY CHARACTERIZATION, SYSTEM AND ASSOCIATED METHODS

(71) Applicant: Merlin Technology, Inc., Kent, WA (US)

(72) Inventors: Rudolf Zeller, Seattle, WA (US); Timothy Shaw, Auburn, WA (US); Timothy Bayliss, Maple Valley, WA (US); Craig Caswell, Stanwood, WA (US)

(73) Assignee: Merlin Technology, Inc., Kent, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/215,127

(22) Filed: Jun. 27, 2023

(65) Prior Publication Data

US 2023/0340869 A1    Oct. 26, 2023

Related U.S. Application Data

(63) Continuation of application No. 17/501,438, filed on Oct. 14, 2021, now Pat. No. 11,814,950, which is a
(Continued)

(51) Int. Cl.
*G01S 19/39* (2010.01)
*E21B 7/04* (2006.01)
(Continued)

(52) U.S. Cl.
CPC ............ *E21B 47/024* (2013.01); *E21B 7/046* (2013.01); *G01B 3/12* (2013.01); *G01S 19/13* (2013.01); *G01S 19/49* (2013.01)

(58) Field of Classification Search
CPC ......... E21B 47/024; E21B 7/046; G01B 3/12; G01S 19/13; G01S 19/49
See application file for complete search history.

(56) References Cited

U.S. PATENT DOCUMENTS

5,720,354 A * 2/1998 Stump ................ E21B 47/0232
175/45
6,035,951 A    3/2000 Mercer et al.
(Continued)

FOREIGN PATENT DOCUMENTS

EP    2796832 A1    10/2014
JP    2011007502 A    1/2011

OTHER PUBLICATIONS

*Applicant's Response to the First Office Action in Indian Application No. 202117058406 from Intellectual Property India, which is related to PCT Application No. PCT/US2020/043114, which is related to U.S. Appl. No. 16/520,182, Mumbai, India, Dec. 21, 2022.
(Continued)

*Primary Examiner* — Tara Schimpf
*Assistant Examiner* — Ursula Lee Norris
(74) *Attorney, Agent, or Firm* — Pritzkau Patent Group LLC; Michael M Pritzkau

(57) ABSTRACT

A planning tool plans movement of a boring tool for an underground drilling operation. The planning tool includes one or more wheels for rolling on a surface of the ground along a path responsive to movement by an operator to characterize the surface contour and to generate guidance for the boring tool to reach a target position. Planning can additionally be based on waypoints. The planning tool can be rolled unidirectionally or bidirectionally to characterize the surface contour. Bidirectional movement cancels accelerometer fixed bias. Path stitching is used to plan around obstacles. The planning tool can facilitate tracker placement.

(Continued)

The planning tool can collect noise information for frequency selection purposes. A described technique maximizes linear drilling in an underground plan. Compensation and/or warnings are provided for unsteady, fast and slow movement of the planning tool while measuring the surface contour.

4 Claims, 26 Drawing Sheets

Related U.S. Application Data continuation of application No. 16/520,182, filed on Jul. 23, 2019, now Pat. No. 11,149,539.

(51) Int. Cl.

| | | |
|---|---|---|
| *E21B 47/024* | (2006.01) | |
| *G01B 3/12* | (2006.01) | |
| *G01C 7/02* | (2006.01) | |
| *G01S 19/13* | (2010.01) | |
| *G01S 19/14* | (2010.01) | |
| *G01S 19/49* | (2010.01) | |

(56) References Cited

U.S. PATENT DOCUMENTS

| | | | |
|---|---|---|---|
| 6,315,062 B1 | 11/2001 | Alft et al. | |
| 6,727,704 B2 | 4/2004 | Brune et al. | |
| 6,749,029 B2 | 6/2004 | Alft et al. | |
| 6,917,813 B2 | 7/2005 | Elizondo | |
| 6,917,893 B2 | 7/2005 | Dietsch et al. | |
| 8,381,836 B2 | 2/2013 | Brune et al. | |
| 8,729,901 B2 | 5/2014 | Lam et al. | |
| 8,862,405 B2 | 10/2014 | Seydoux et al. | |
| 9,540,879 B2 | 1/2017 | Kolpack et al. | |
| 9,739,140 B2 | 8/2017 | Zeller et al. | |
| 9,971,013 B2* | 5/2018 | Cole | G01V 3/15 |
| 2001/0022238 A1 | 9/2001 | Houwelingen et al. | |
| 2002/0116129 A1 | 8/2002 | Alft et al. | |
| 2006/0041366 A1 | 2/2006 | Kato et al. | |
| 2011/0001633 A1* | 1/2011 | Lam | G01V 3/15 |
| | | | 340/853.1 |
| 2015/0198440 A1 | 7/2015 | Pearlman et al. | |
| 2016/0348496 A1 | 12/2016 | Brune et al. | |
| 2017/0017009 A1 | 1/2017 | Olsson et al. | |
| 2017/0022799 A1 | 1/2017 | Perteet et al. | |
| 2019/0003299 A1 | 1/2019 | Zeller et al. | |
| 2021/0025273 A1 | 1/2021 | Zeller et al. | |
| 2022/0107167 A1* | 4/2022 | Zeller | G01B 5/20 |

OTHER PUBLICATIONS

*Applicant's Response to the International Search Report and The Written Opinion of the International Searching Authority for International Application No. PCT/US2020/043114 which is associated with U.S. Appl. No. 16/520,182, filed May 6, 2021, Los Angeles, CA, USA.

*First Office Action in Indian Application No. 202117058406 from Intellectual Property India, which is related to PCT Application No. PCT/US2020/043114, which is related to U.S. Appl. No. 16/520,182, Mumbai, India, Jun. 22, 2022.

*First Office Action in Russian Application No. 2021137996/03 from Federal Institute of Industrial Property, which is related to PCT Application No. PCT/US2020/043114, which is related to U.S. Appl. No. 16/520,182, Moscow, Russia, Jun. 3, 2022. (machine translation included).

*The Extended European Search Report International Search Report of the European Patent Office for European Application No. 20844693.0 which is related to International Application No. PCT/US2020/043114 which is associated with U.S. Appl. No. 16/520,182, filed Jul. 18, 2023, Munich, Germany.

*The International Search Report and The Written Opinion of the International Searching Authority for International Application No. PCT/US2020/043114 which is associated with U.S. Appl. No. 16/520,182, filed Oct. 15, 2020, Daejeon, Republic of Korea.

Applicant Response to the Extended European Search Report of the European Patent Office for European Application No. 20844693.0 which is related to International Application No. PCT/US2020/043114 which is associated with U.S. Appl. No. 16/520,182, filed Feb. 5, 2024, Munich, Germany.

Applicant's Response to the First Office Action in U.S. Appl. No. 17/155,961, filed May 9, 2024.

Hearing Notice in Indian Application No. 202117058406 from Intellectual Property India, which is related to PCT Application No. PCT/US2020/043114, which is related to U.S. Appl. No. 16/520,182, Mumbai, India, Jan. 4, 2024.

The Final Office Action in U.S. Appl. No. 17/155,961, filed May 9, 2024.

The First Office Action in U.S. Appl. No. 17/155,961, filed Aug. 31, 2023.

* cited by examiner

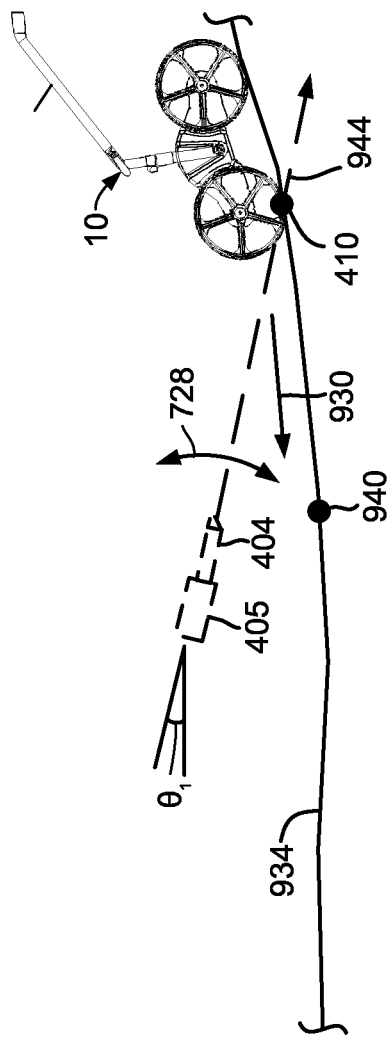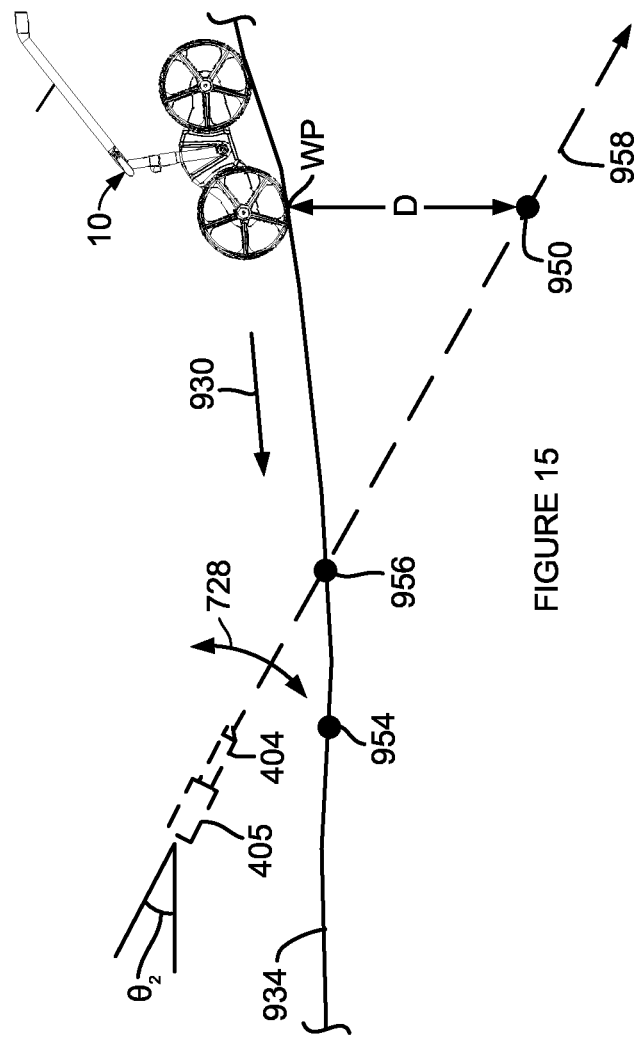

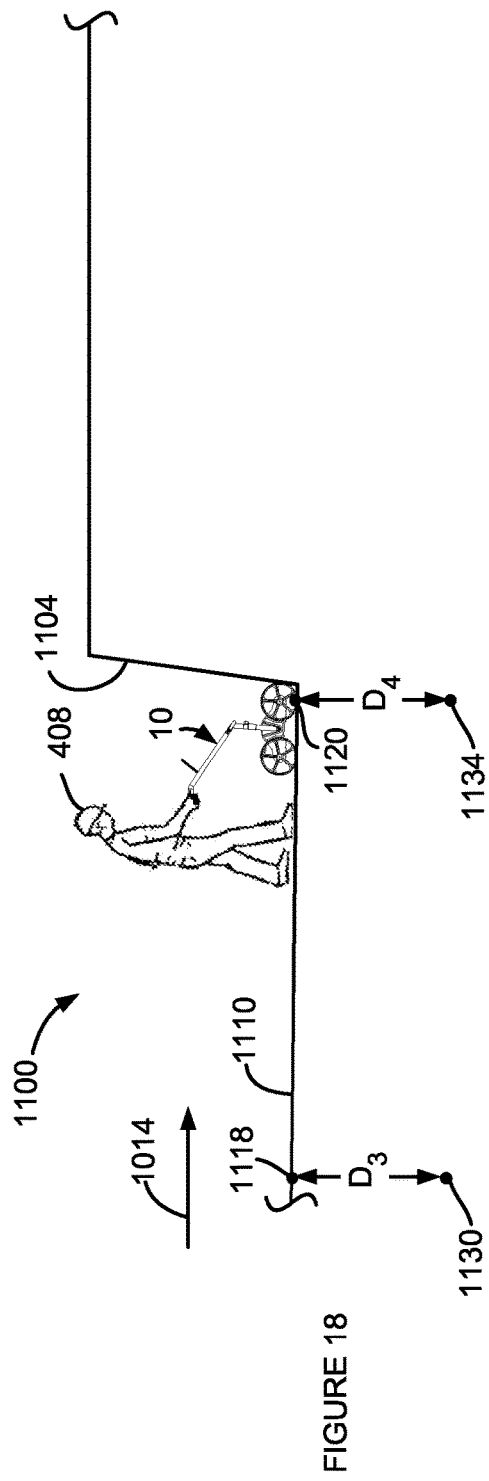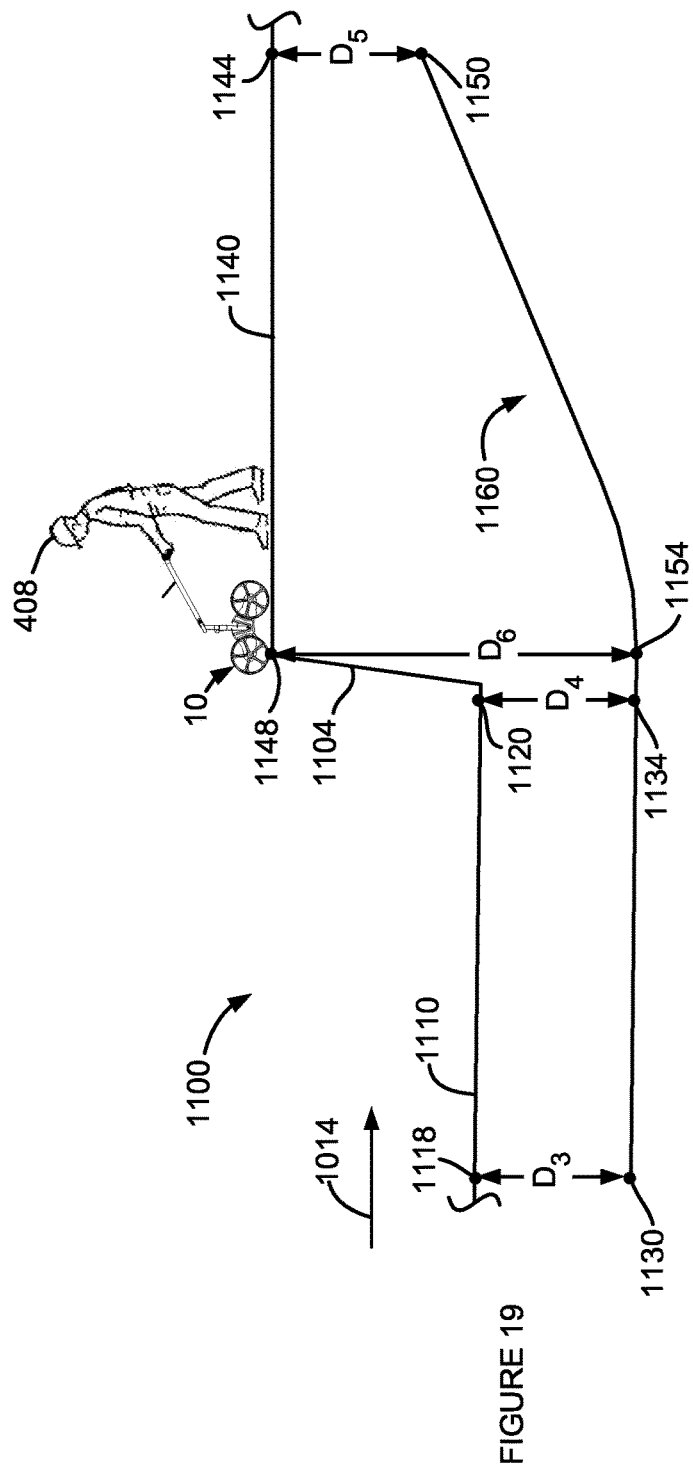
FIGURE 18
FIGURE 19

DRILL PLANNING TOOL FOR TOPOGRAPHY CHARACTERIZATION, SYSTEM AND ASSOCIATED METHODS

RELATED APPLICATIONS

The present application is a continuation application of copending U.S. patent application Ser. No. 17/501,438, filed on Oct. 14, 2021, which is a continuation application of U.S. patent application Ser. No. 16/520,182 filed on Jul. 23, 2019 and issued as U.S. Pat. No. 11,149,539 on Oct. 19, 2021, the disclosures of which are incorporated by reference.

BACKGROUND

The present application is generally related to the field of drill planning in a horizontal directional drilling (HDD) system and, more particularly, to a planning tool or measurement instrument for topography characterization in real time and associated methods.

The state-of-the-art approach in planning for a horizontal direction drilling job includes creating an underground bore plan in advance of the drilling project. Generating a bore plan may be accomplished by walking the proposed bore path before drilling commences, with or without the use of commercially available bore planning software, or in some cases a bore plan is formed remotely, without specifically viewing the jobsite, from the comfort of an office. However, Applicants have noted that a significant majority of HDD projects are conducted without a bore plan. Factors such as cost in terms of time and resources involved with forming a bore plan prior to drilling are deterrents to advance bore planning. Perhaps most importantly, Applicants have discovered that many drilling contractors find that obstacles, utilities, differences in terrain or landscape from what was anticipated, and other similar factors, require drillers to deviate from a bore plan, rendering a bore plan obsolete or moot. For example, the presence of an unknown utility line or other inground obstacle might be identified upon arrival of the drilling crew at the worksite, or after drilling has started, such that the bore plan quickly becomes obsolete (perhaps even before drilling has begun).

Additionally, particularly where terrain is hilly, sloped, includes valleys, or is generally uneven, forming an accurate and useful bore plan may require professional surveying of the surface topography of the drilling region in advance of the drilling operation. Depth readings and targets may not be as helpful without giving effect to changes in topography. Unfortunately, the cost of such professional surveying can be significant, and professional surveying takes additional time and may be difficult to arrange, all of which deter contractors from taking this step or preparing a bore plan at all. Applicants recognize that attempting to execute a drill run without a detailed characterization of the surface topography in uneven terrain is extremely difficult due to rapid variations in depth along the drill run.

Global Navigation Satellite System (GNSS), including GPS, is a potential alternative to professional surveying for measuring topography. However, to date, GNSS solutions have not been practical for measuring topography at HDD jobsites. Applicable GNSS solutions historically have not provided the requisite level of precision at a cost that is practical for HDD applications, but GNSS technology continues to evolve in that regard. In particular because of the locales where HDD is performed, GNSS receivers are not always able to read enough GNSS satellites to consistently obtain GNSS readings at HDD jobsites, due to high-rise buildings, dense clouds, trees and other obstacles.

One approach taken in the prior art in attempting to deal with advance bore planning is described in commonly owned U.S. Pat. No. 6,035,951 using what is referred to as a mapping tool 550 that is shown in FIG. 14. Unfortunately, the mapping tool is not usable alone and must instead be used as part of an overall system with separate, above ground receivers that receive a dipole signal 580 that is transmitted by the mapping tool. Some primary shortcomings of this mapping tool include (1) the time and resources required to set up the system, in particular for the receivers to be able to identify the position of the mapping tool, and (2) this mapping tool is designed for creating bore plans in advance of drilling, and is not designed (and is difficult to use) for purposes of real-time bore navigation or for modifying a prior bore plan. Similarly, U.S. Pat. No. 6,749,029 describes an advance bore planning method that involves the traditional method of generating a bore plan from entry to exit, covering the entire bore path in advance of drilling. This approach likewise introduces the same costs in terms of advance setup time and resources, and suffers from complications when factors arise during the bore that require deviation from the original bore path.

Applicants recognize that there is a need for a tool that helps guide drillers around obstacles and/or to desired target points during drilling, in a real-time, dynamic, on-the-fly manner, without the up front cost in terms of time and resources that traditional bore planning tools and methods currently require. Applicants further recognize the need for such a tool that also is advanced enough to account for uneven, complex terrains and that factors this into the boring guidance without the need for a professional survey of the drilling region. Applicants also recognize the need for such a system that accepts GNSS data when such data is available, but can still generate topographical data when GNSS data is not available, such that the tool can be consistently used at HDD jobsites even if obstacles exist that block the availability of GNSS data.

The foregoing examples of the related art and limitations related therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

In one aspect of the disclosure, a planning tool and associated method are described for planning movement of a boring tool during an underground drilling operation, the boring tool forming part of a system for horizontal directional drilling in which a drill rig advances the boring tool through the ground using a drill string that extends from the drill rig to the boring tool. In an embodiment, the planning tool includes one or more wheels for rolling on a surface of the ground along a path responsive to movement by an operator, the path at least including (i) an initial surface position proximate to a current position of the boring tool with the boring tool at a current orientation and (ii) a subsequent surface position proximate to a user specified target position for the boring tool that is ahead of the current position. An encoder generates an encoder output responsive to the rolling of one of the wheels between the initial surface position and the subsequent surface position. An accelerometer includes at least one measurement axis for generating an accelerometer output during the rolling of the wheels along the path that characterizes a pitch orientation of the planning tool. A processor accepts a user input that specifies the target position ahead of the boring tool with the boring tool located at the current position and the current orientation, and generates guidance for the boring tool to reach the target position based on the current position, the current orientation, the encoder output and the accelerometer output.

In another embodiment including an associated method, a planning tool is part of a system for horizontal directional drilling in which a drill rig advances a boring tool through the ground using a drill string that extends from the drill rig to the boring tool. The planning tool includes one or more wheels for rolling on a surface of the ground along a path responsive to movement by an operator. An encoder for generating an encoder output responsive to the rolling of one of the wheels. An accelerometer includes at least one measurement axis for generating an accelerometer output during the rolling of the wheels that characterizes a pitch orientation of the planning tool. A processor generates an underground plan for the boring tool below the surface of the ground in relation to the path based on the encoder output and the accelerometer output.

In another aspect of the disclosure, a system and associated method are described for horizontal directional drilling. An embodiment of the system includes a boring tool for forming a borehole and a drill rig for moving the boring tool. A planning tool includes one or more wheels for rolling on a surface of the ground responsive to movement by an operator along a path, an encoder for generating an encoder output responsive to the rolling of one of the wheels, an accelerometer including at least one measurement axis for generating an accelerometer output that characterizes a pitch orientation of the planning tool, and a processor for generating an underground plan for the boring tool below the surface of the ground relative to the path based on the encoder output and the accelerometer output.

In yet another aspect of the disclosure including an associated method, a planning tool forms part of a system for horizontal directional drilling in which a drill rig advances a boring tool through the ground in a forward direction using a drill string that extends from the drill rig to the boring tool. An embodiment of the planning tool includes one or more wheels for rolling on a surface of the ground along a path responsive to movement by an operator. An encoder generates an encoder output responsive to the rolling of one of the wheels. An accelerometer includes at least one measurement axis for generating an accelerometer output during said rolling that characterizes a pitch orientation of the planning tool. A user interface accepts operator input designating one or more positions along the path and a processor for generates an underground plan for the boring tool below the surface of the ground in relation to said path based on the encoder output, the accelerometer output and the designated positions. In another embodiment and associated method, a planning tool is part of a system for horizontal directional drilling in which a drill rig advances a boring tool in a forward direction through the ground using a drill string that extends from the drill rig to the boring tool. The embodiment including one or more wheels for rolling on a surface of the ground along a path in a reverse direction, opposite the forward direction, beginning from a predetermined position and responsive to movement by an operator. An encoder for generating an encoder output responsive to the rolling of one of the wheels in the reverse direction. An accelerometer including at least one measurement axis for generating an accelerometer output during said rolling in the reverse direction that characterizes a pitch orientation of the planning tool and a processor for generating a setback position for the drill rig on the path in the reverse direction from the predetermined position based on a surface contour of the path in the reverse direction as characterized by the encoder output and the accelerometer output.

In still another embodiment and associated method, a planning tool is part of a system for horizontal directional drilling in which a drill rig advances a boring tool through the ground using a drill string that extends from the drill rig to the boring tool. The planning tool includes one or more wheels for rolling on a surface of the ground along a path responsive to an operator. An encoder generates an encoder output responsive to the rolling of at least one of the wheels. An accelerometer includes at least one measurement axis for generating an accelerometer output, during the rolling, that characterizes a pitch orientation of the planning tool and the accelerometer output also includes one or more pitch errors responsive to operator induced accelerations that result from one or more changes in a velocity of the planning tool during the rolling by the operator. A processor is configured for detecting the changes in the velocity based on the encoder output and for applying compensation to the accelerometer output based on the detected changes to generate a compensated pitch orientation with the pitch errors substantially removed.

In yet another embodiment and associated method, a planning tool is part of a system for horizontal directional drilling in which a drill rig advances a boring tool through the ground using a drill string that extends from the drill rig to the boring tool. The planning tool includes one or more wheels for rolling on a surface of the ground along a path responsive to movement by an operator. An encoder generates an encoder output responsive to the rolling of one of the wheels. An accelerometer includes at least one measurement axis for generating an accelerometer output during the rolling of the wheels that characterizes a pitch orientation of the planning tool and a processor generates (i) an indication to the operator when a rate of the rolling exceeds a threshold rate to advise the operator to slow down thereby maintaining contact between the wheels and the surface of the ground and (ii) a surface contour of the path in a vertical plane based on the encoder output and the accelerometer output.

In an additional embodiment and associated method, a planning tool is part of a system for horizontal directional drilling in which a drill rig advances a boring tool through the ground using a drill string that extends from the drill rig to the boring tool. The planning tool includes a wheel for rolling on a surface of the ground along a path responsive to movement by an operator. An encoder generates an encoder output responsive to the rolling of the wheel. An accelerometer includes at least one measurement axis for generating an accelerometer output during the rolling that characterizes a pitch orientation of the planning tool, the accelerometer output exhibiting a temperature sensitive drift. An oven receives the accelerometer for maintaining the accelerometer at an at least approximately constant temperature to substantially reduce the temperature sensitive drift during the rolling and a processor generates a surface contour of the path at least in a vertical plane based on the encoder output and the accelerometer output.

In another embodiment and associated method, a planning tool is part of a system for horizontal directional drilling in which a drill rig advances a boring tool through the ground using a drill string that extends from the drill rig to the boring tool. The planning tool includes a wheel for rolling on a surface of the ground along a path responsive to movement by an operator, the path including a start position and an end position. An encoder generates an encoder output responsive to the rolling of the wheel. An accelerometer includes at least one measurement axis for generating an accelerometer output during the rolling that characterizes a pitch orientation of the planning tool and the accelerometer output is subject to a fixed bias that introduces a pitch orientation measurement error in the accelerometer output and a processor records an outbound set of data, including a plurality of outbound encoder readings indexed against a plurality of outbound accelerometer readings responsive to the planning tool rolling from the start position to the end position and for recording an inbound set of data including a plurality of inbound encoder readings indexed against a plurality of inbound accelerometer readings responsive to the planning tool rolling in a reverse direction from the end position to the start position and for combining the outbound set of data with the inbound set of data to generate a surface contour at least in a vertical plane between the start position and the end position in a way that at least substantially cancels the pitch orientation measurement error in the accelerometer output.

In another embodiment, a method is described for use in a system for horizontal directional drilling in which a drill rig advances a boring tool through the ground using a drill string that extends from the drill rig to the boring tool, the method includes rolling a planning tool in an outbound direction from a start position to an end position while reading an accelerometer output of an accelerometer that forms part of the planning tool to characterize a pitch orientation thereof as part of collecting an outbound set of data, the accelerometer output subject to a pitch orientation measurement error resulting from a fixed measurement bias of the accelerometer. The planning tool is rolled in an inbound direction from the end position to the start position in a reverse direction while reading the accelerometer output to characterize the pitch orientation thereof to collect an inbound set of data with the accelerometer output subject to the pitch orientation measurement error due to the fixed measurement bias for combining the outbound set of data with the inbound set of data in a way that cancels the fixed measurement bias while generating a surface contour between the start position and the end position.

In another embodiment and associated method, a planning tool is part of a system for horizontal directional drilling in which a drill rig advances a boring tool through the ground using a drill string that extends from the drill rig to the boring tool. The planning tool includes a primary wheel having a primary wheel diameter for rotation about a primary wheel axis for rolling on a surface of the ground along a path responsive to movement by an operator. A following wheel includes a following wheel diameter that is the same as the primary wheel diameter for rotation about a following wheel axis during the rolling. A housing supports the primary wheel and the following wheel in-line for coplanar rotation such that the following wheel axis is fixedly spaced apart from the primary wheel axis and at least generally parallel thereto. An encoder generates an encoder output responsive to rolling of the primary wheel and an accelerometer is supported between the primary wheel axis and the following wheel axis by the housing, the accelerometer including at least one measurement axis for generating an accelerometer output during the rolling that characterizes a pitch orientation of the planning tool. A processor generates a surface contour of said path at least in a vertical plane based at least on the encoder output and the accelerometer output.

In still another embodiment and associated method, a planning tool is part of a system for horizontal directional drilling in which a drill rig advances a boring tool through the ground using a drill string that extends from the drill rig to the boring tool. The planning tool includes one or more wheels for rolling on a surface of the ground along a first path and a second path responsive to movement by an operator with the first path and the second path separated from one another by an obstacle. An encoder generates an encoder output responsive to the rolling of one of the wheels. An accelerometer includes at least one measurement axis for generating an accelerometer output during the rolling of the wheels that characterizes a pitch orientation of the planning tool. A processor for generates an underground plan for the boring tool below the surface of the ground in relation to the first path and the second path based on the encoder output and the accelerometer output such that the underground plan includes a first bore segment corresponding to the first path, a second bore segment corresponding to the second path and a stitching bore segment that links the first bore segment to the second bore segment.

In yet another embodiment and associated method, a planning tool is part of a system for horizontal directional drilling in which a drill rig advances a boring tool through the ground to perform an underground operation using a drill string having a drill string length that extends from the drill rig to the boring tool. The planning tool includes one or more wheels for rolling on a surface of the ground along a path responsive to movement by an operator. An encoder generates an encoder output responsive to the rolling of one of the wheels. A noise receiver generates noise data across a frequency bandwidth responsive to the rolling. a processor (i) generates an underground plan for the boring tool below the path beginning from a start position at which the boring tool enters the ground at least based on a surface contour of the path as defined by the encoder output and the accelerometer output and (ii) correlates the noise data measured along the path above the surface of the ground with a distance from the start position along the underground plan based on the contour such that for any given position on the underground path a set of correlated noise data corresponds to an overhead position on the path that is directly above the given position to compensate for a difference between a first distance along the underground plan to reach the given position and a second distance along the path to reach the overhead position which difference results from a vertical offset between the underground plan and the path.

In a further embodiment and associated method, a planning tool is used in conjunction with a system in which a drill rig advances a boring tool, that transmits an electromagnetic locating signal, for horizontal directional drilling through the ground, the system including a plurality of trackers positionable on a surface of the ground for tracking the boring tool underground based on receiving the electromagnetic locating signal. The planning tool includes one or more wheels for rolling along a path on the surface of the ground responsive to an operator. An encoder generates an encoder output responsive to the rolling of one of the wheels. A processor measures a distance rolled along said path based on the encoder output and, responsive to detecting that the planning tool has rolled a specified distance, generates an indication for the operator to place one of the trackers on the path.

In an additional embodiment and associated method, a planning tool is described for use in conjunction with a system in which a drill rig advances a boring tool, that transmits an electromagnetic locating signal, for horizontal directional drilling through the ground, the system including a plurality of trackers positionable on a surface of the ground for tracking the boring tool underground based on receiving the electromagnetic locating signal. The planning tool includes one or more wheels for rolling along a path on the surface of the ground responsive to an operator. An encoder generates an encoder output responsive to the rolling of one of the wheels. An accelerometer includes at least one measurement axis for generating an accelerometer output during the rolling that characterizes a pitch orientation of the planning tool. A processor is configured to determine a surface contour of the path in a vertical plane based on the encoder output and the accelerometer output and to generate an indication to place one of the trackers on the path based on the contour.

In another embodiment and associated method, a planning tool is described for use with a system in which a drill rig advances a boring tool that transmits an electromagnetic locating signal for horizontal directional drilling through the ground, the system including a plurality of trackers positionable on a surface of the ground for tracking the boring tool underground based on receiving the electromagnetic locating signal. The planning tool includes one or more wheels for rolling along a path on the surface of the ground responsive to an operator. An encoder generates an encoder output responsive to the rolling of one of the wheels. An accelerometer includes at least one measurement axis for generating an accelerometer output during the rolling that characterizes a pitch orientation of the planning tool. A user interface serves an operator for designating at least one position along the path at which a particular one of the trackers is placed by the operator and is configured for user entry of a target depth for the boring at a target position tool directly below the particular tracker. A processor determines a surface contour of the path in a vertical plane based on the encoder output and the accelerometer output and generates an underground plan for the boring tool below the surface of the ground which passes through the target position.

In still another embodiment and associated method, a planning tool is part of a system for horizontal directional drilling in which a drill rig advances a boring tool through the ground to perform an underground operation using a drill string having a drill string length that extends from the drill rig to the boring tool. The planning tool includes one or more wheels for rolling on a surface of the ground along a path responsive to movement by an operator. An encoder generates an encoder output responsive to the rolling of one of the wheels. A noise receiver generates noise data across a frequency bandwidth responsive to the rolling. A processor (i) generates an underground plan for the boring tool below the path beginning from a start position at which the boring tool enters the ground at least based on a surface contour of the path as defined by the encoder output and the accelerometer output and (ii) generates a set of frequency selections for use along the underground path correlated with distance based on the noise data measured at the surface of the ground.

In a further embodiment and associated method, a planning tool is described for planning movement of a boring tool during an underground drilling operation, the boring tool forming part of a system for horizontal directional drilling in which a drill rig advances the boring tool through the ground using a drill string that extends from the drill rig to the boring tool. The planning tool includes a processor configured for developing an underground plan from a current point to a target endpoint by maximizing an amount of linear drilling for the boring tool from the current point to the target endpoint.

BRIEF DESCRIPTIONS OF THE DRAWINGS

Example embodiments are illustrated in referenced figures of the drawings. It is intended that the embodiments and figures disclosed herein are to be illustrative rather than limiting.

Figure 1:
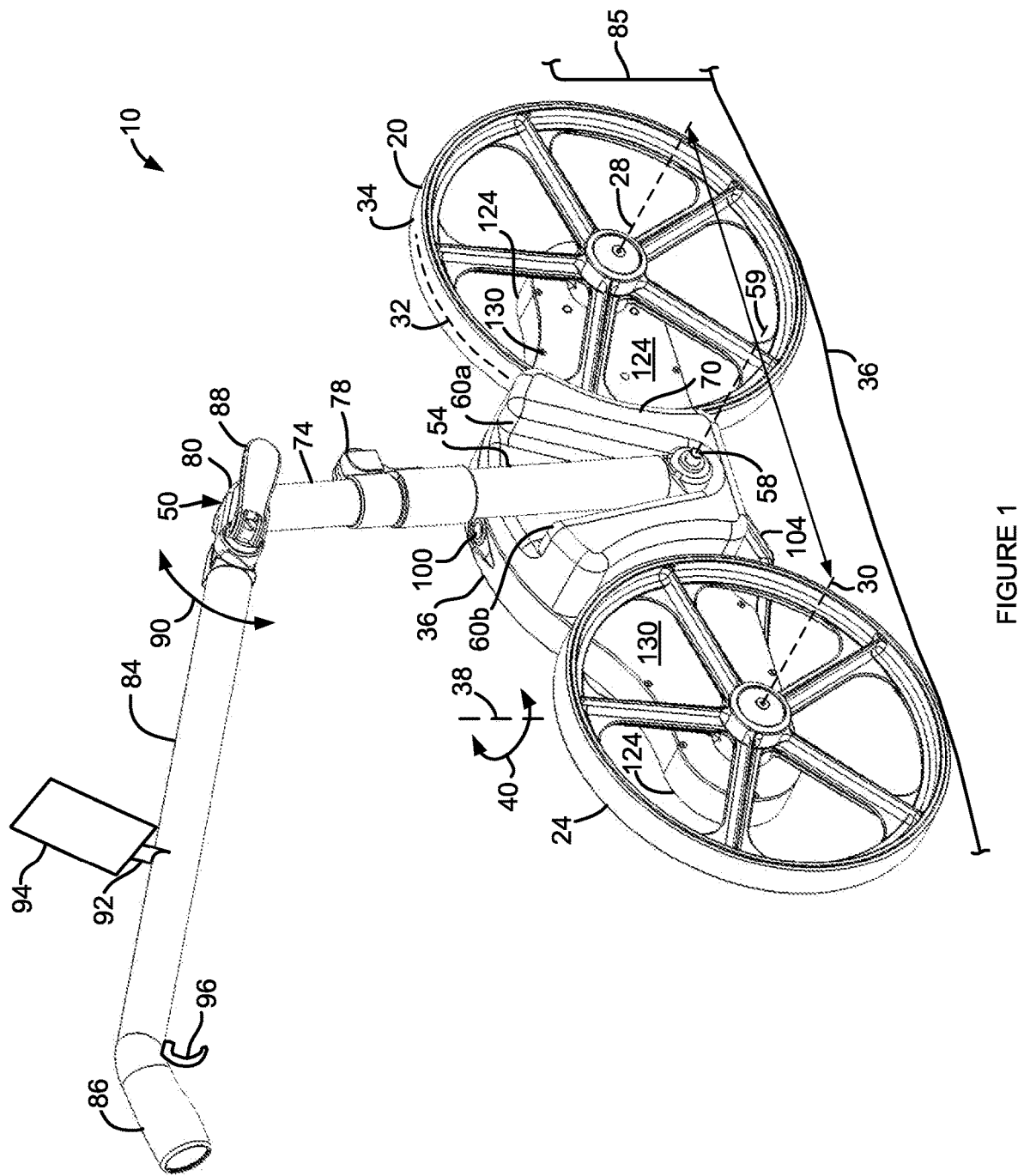
FIG. 1 is a perspective view taken from one side and to the rear of an embodiment of a planning tool for topography characterization in accordance with the present disclosure.
Figure 3:
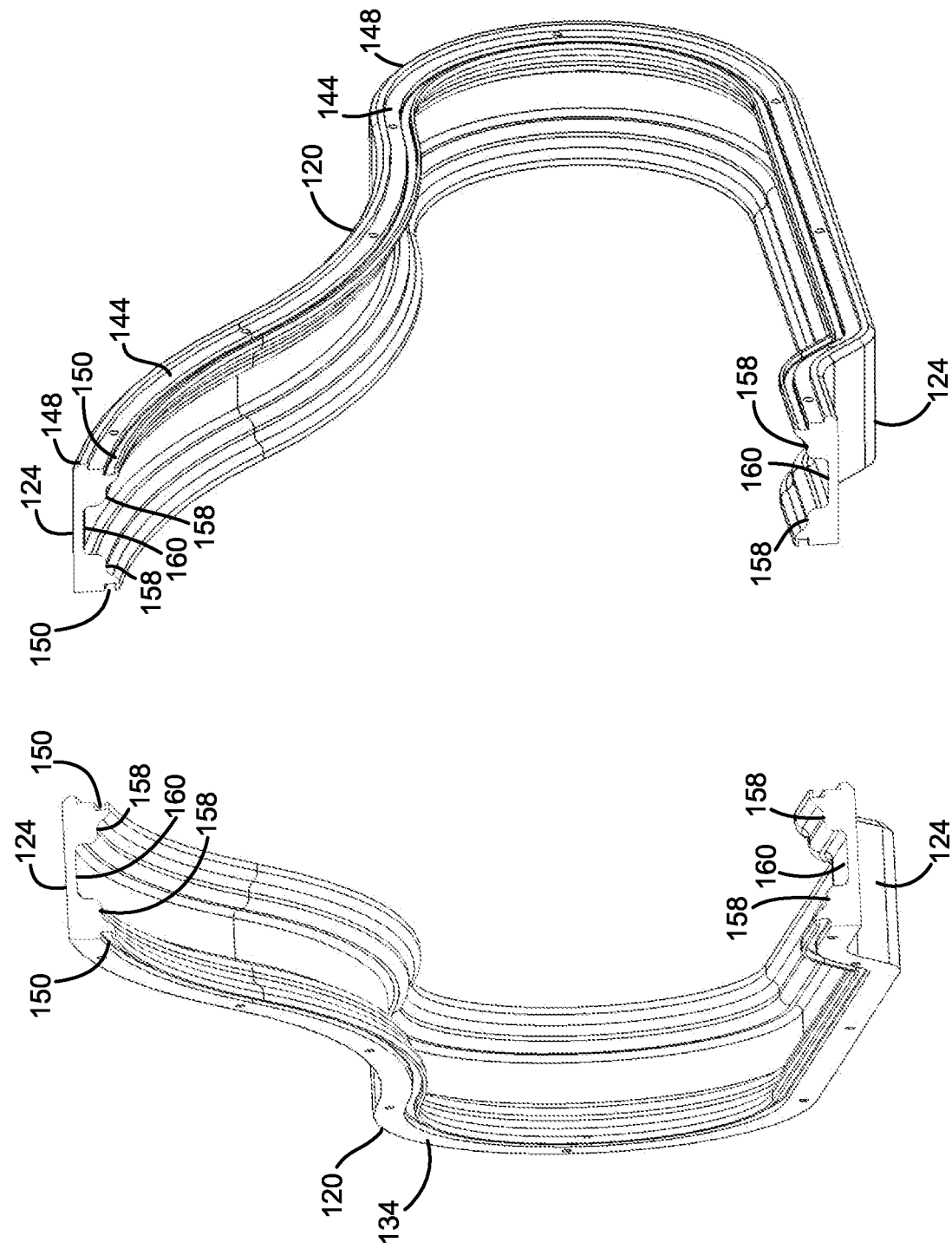

FIGS. 3*a* and 3*b* are diagrammatic partially cutaway views, in elevation, that illustrate an embodiment of a frame forming part of the planning tool of FIG. 1.

Figure 2:
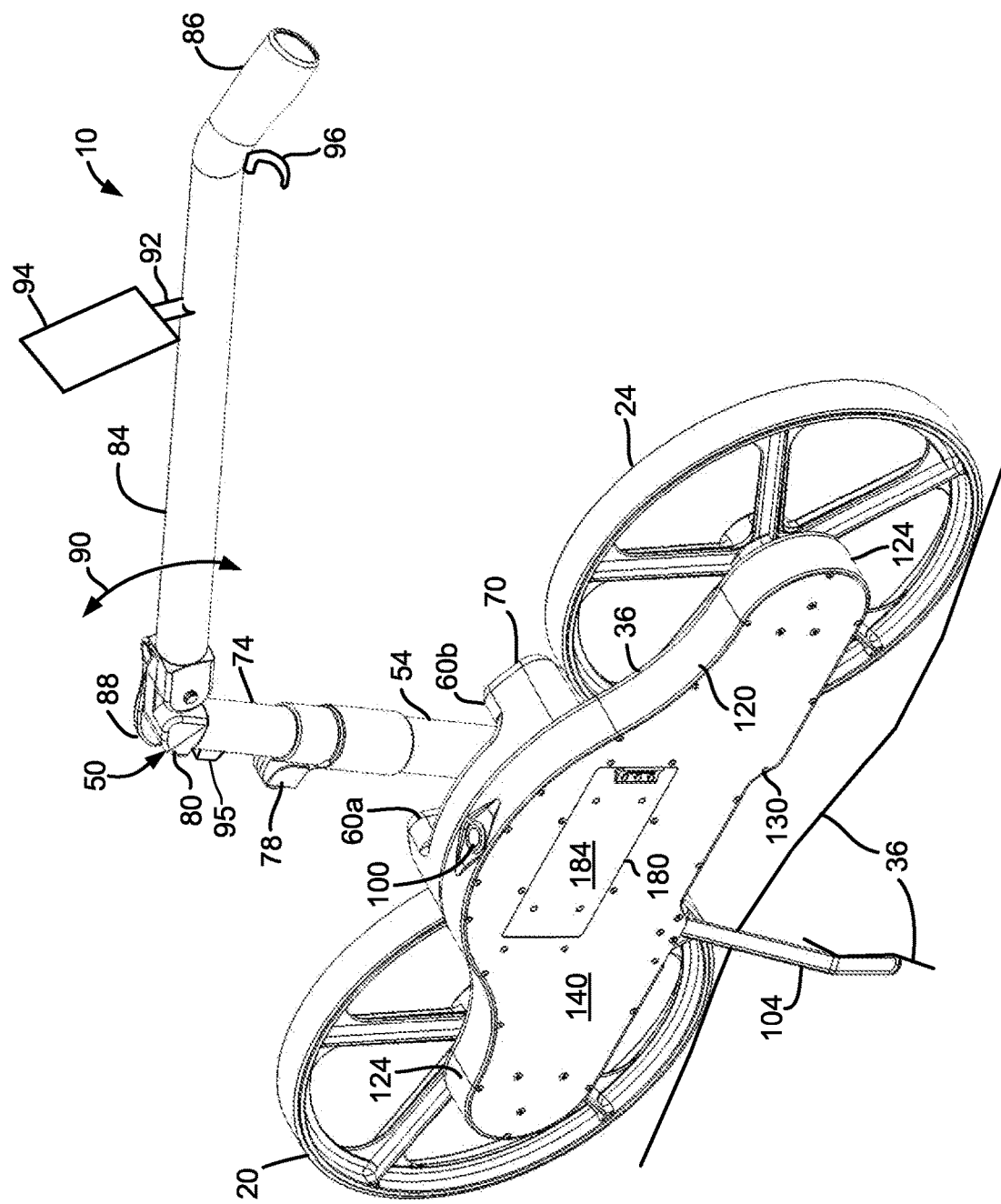
FIG. 2 is a perspective view taken from an opposite side and to the rear of the embodiment of the planning tool of FIG. 1.
Figure 4:
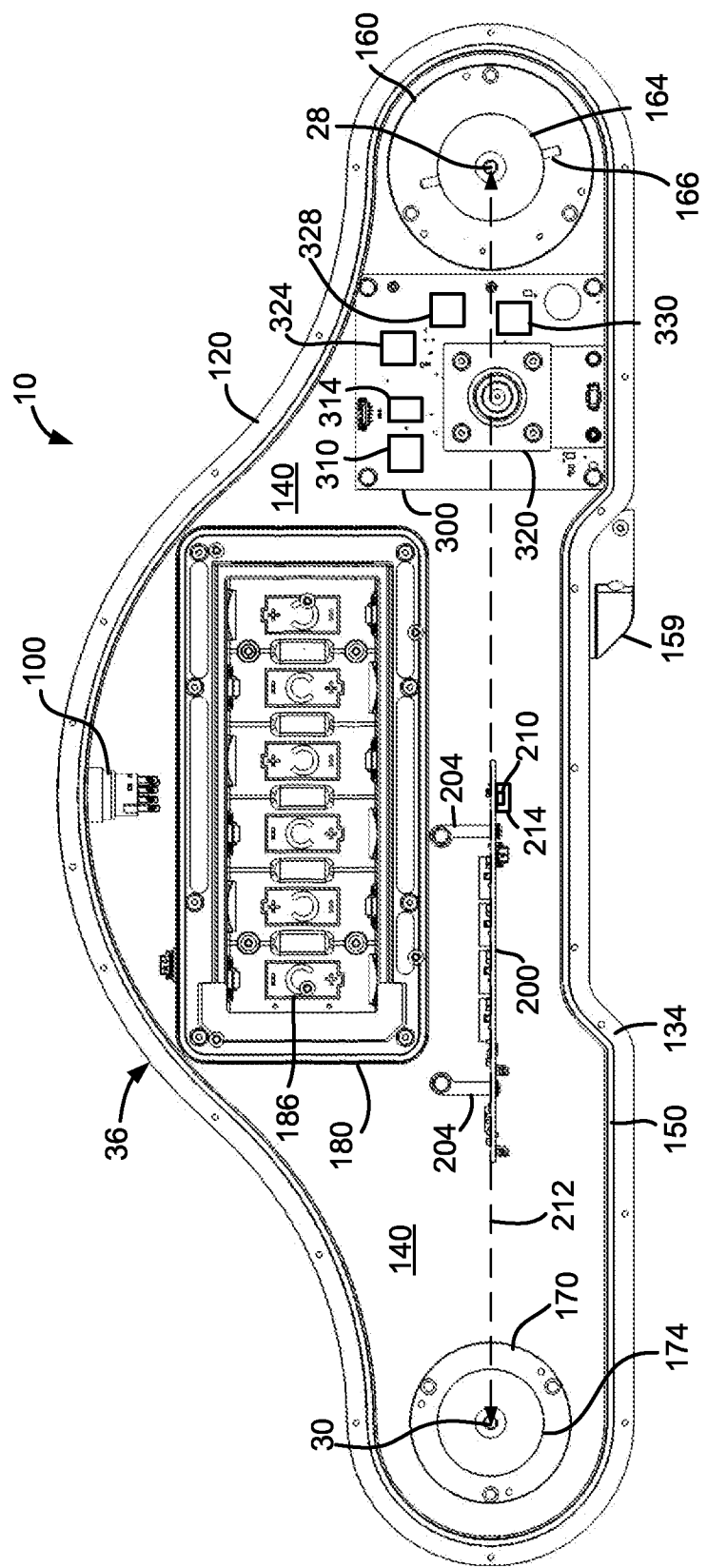

FIG. 4 is diagrammatic view, in elevation, that illustrates an embodiment of the internal structure and components of the planning tool of FIGS. 1 and 2.

Figure 5:
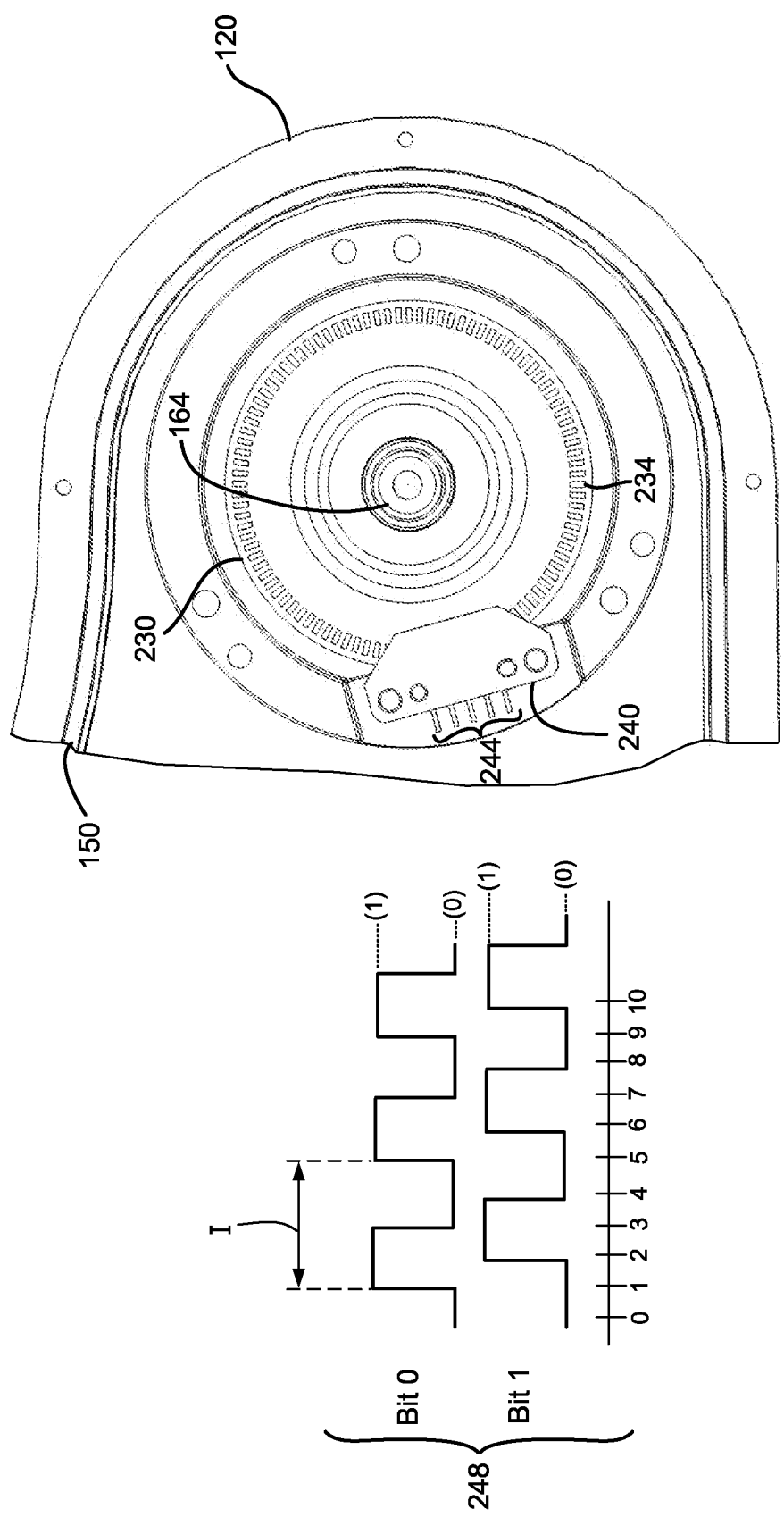

FIG. 5 is a diagrammatic, partially cutaway view, in elevation, showing an embodiment of a portion of the internal structure of the planning tool of FIGS. 1 and 2 including an encoder wheel and optical reader.

Figure 6A:
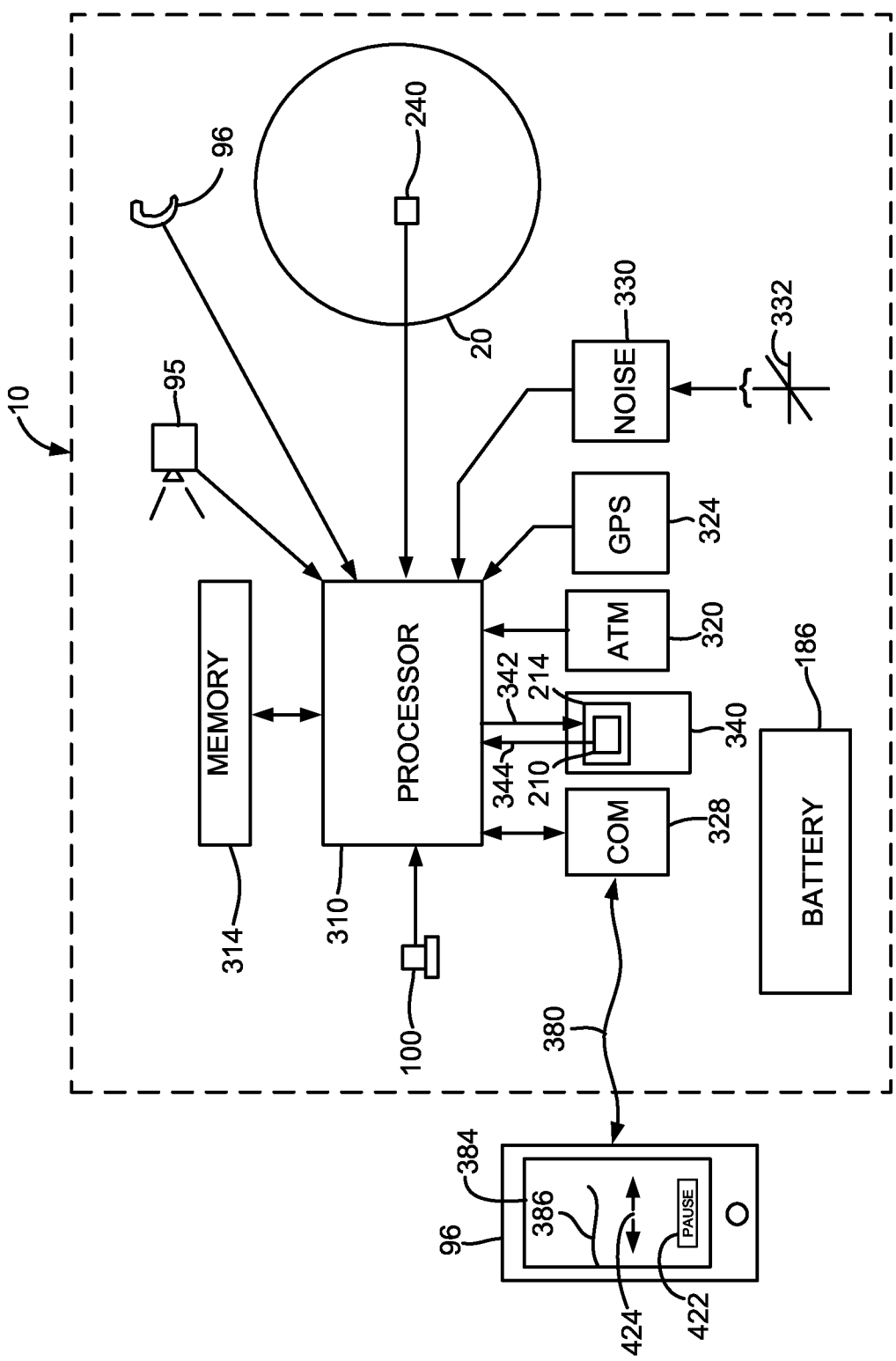

FIG. 6*a* is a block diagram illustrating an embodiment of the electrical components of the planning tool of FIGS. 1 and 2.

Figure 6B:
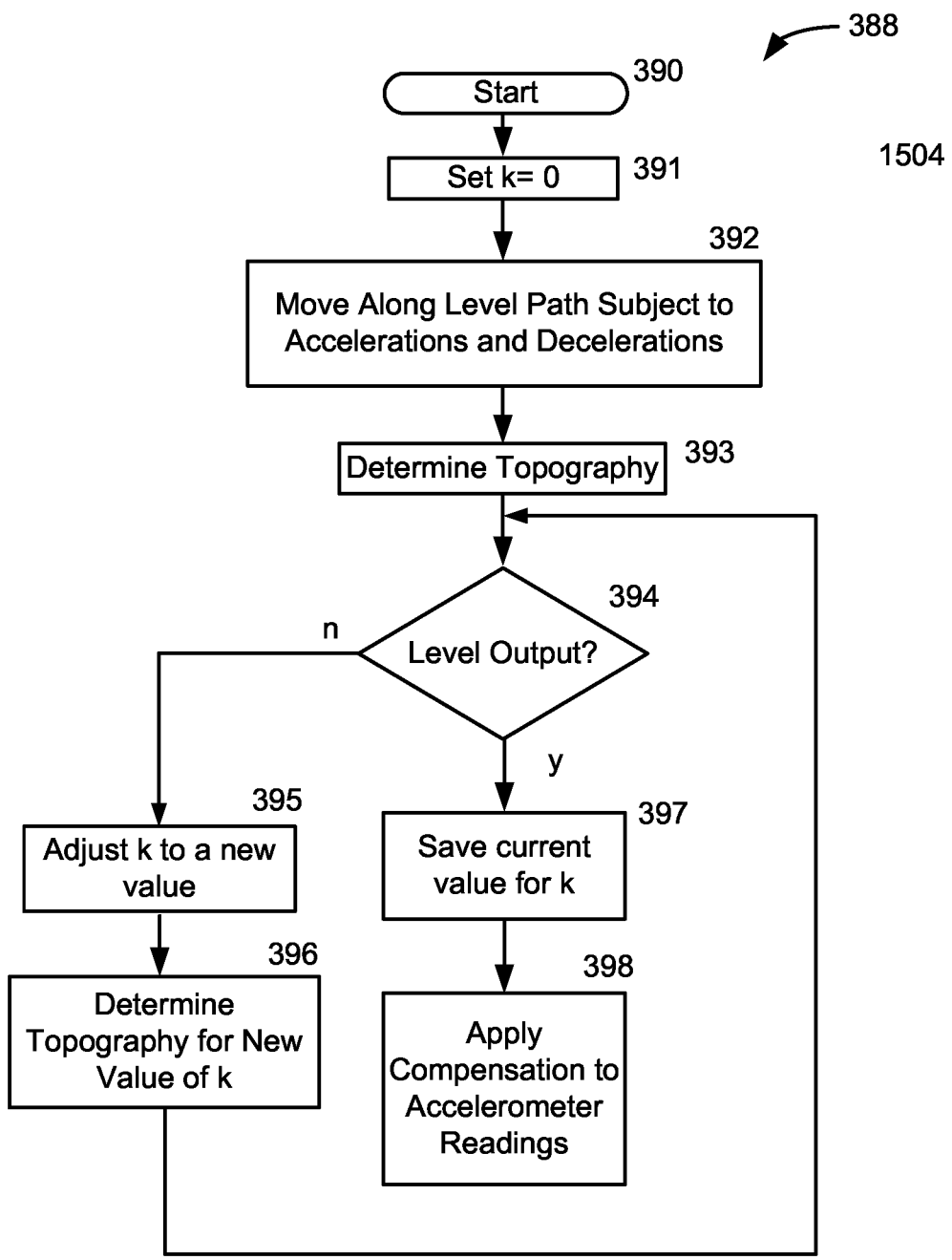

FIG. 6*b* is a flow diagram illustrating an embodiment of a method for determining a calibration coefficient to compensate for unsteady movement induced by an operator.

Figure 7:
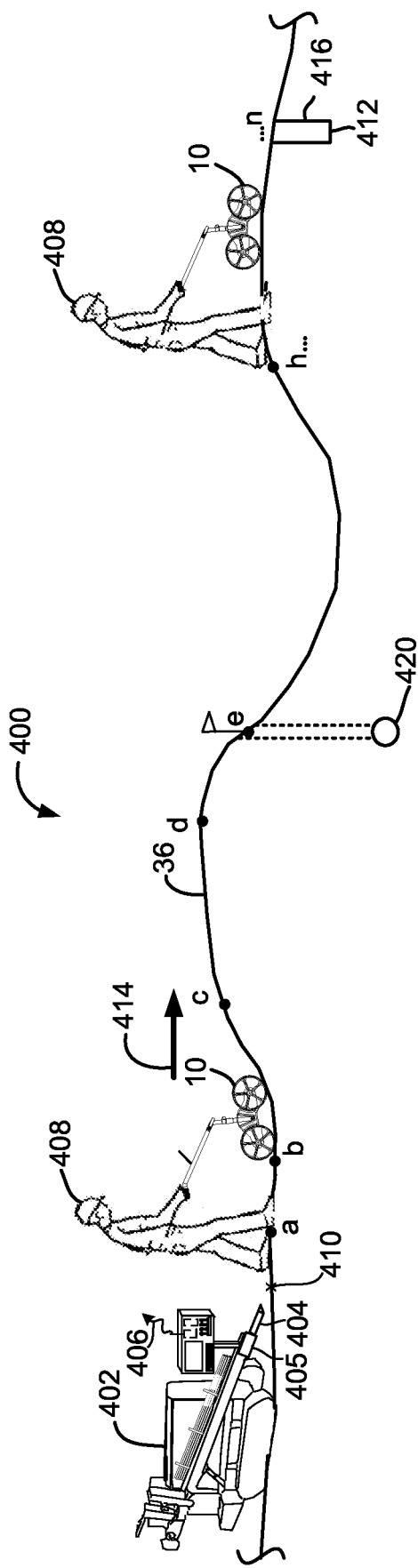

FIG. 7 is diagrammatic view, in elevation, of an operator walking the planning tool away or outbound from the drill rig along the topography contours of the surface of the ground from a drill rig to a drill run exit position in accordance with the present disclosure as part of one embodiment for developing an underground plan.

Figure 8:
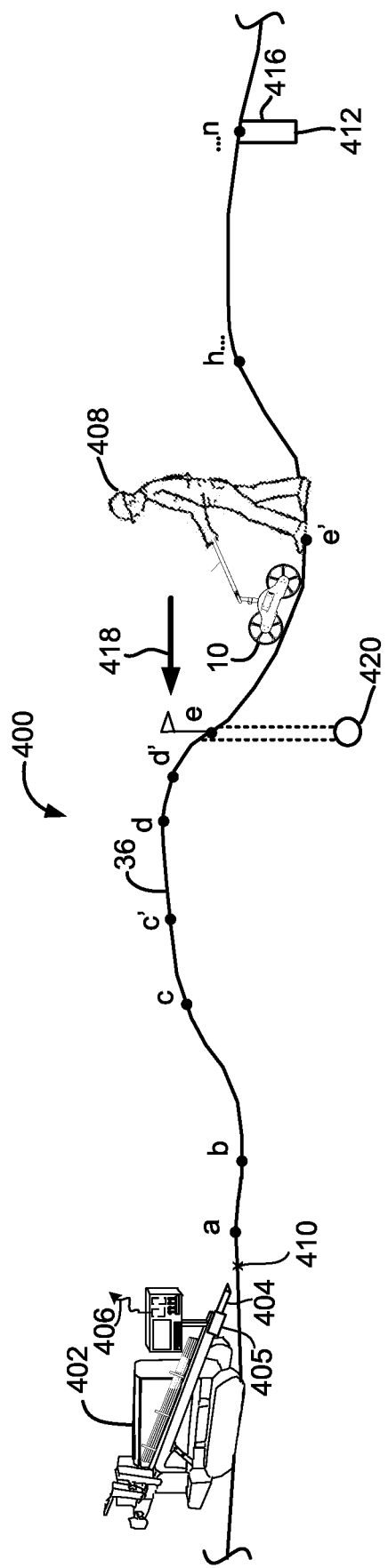

FIG. 8 is another diagrammatic view, in elevation, of the operator walking the planning tool in an opposite direction, toward the drill rig, along the topography contours of the surface of the ground as another part of developing the underground plan.

Figure 9A:
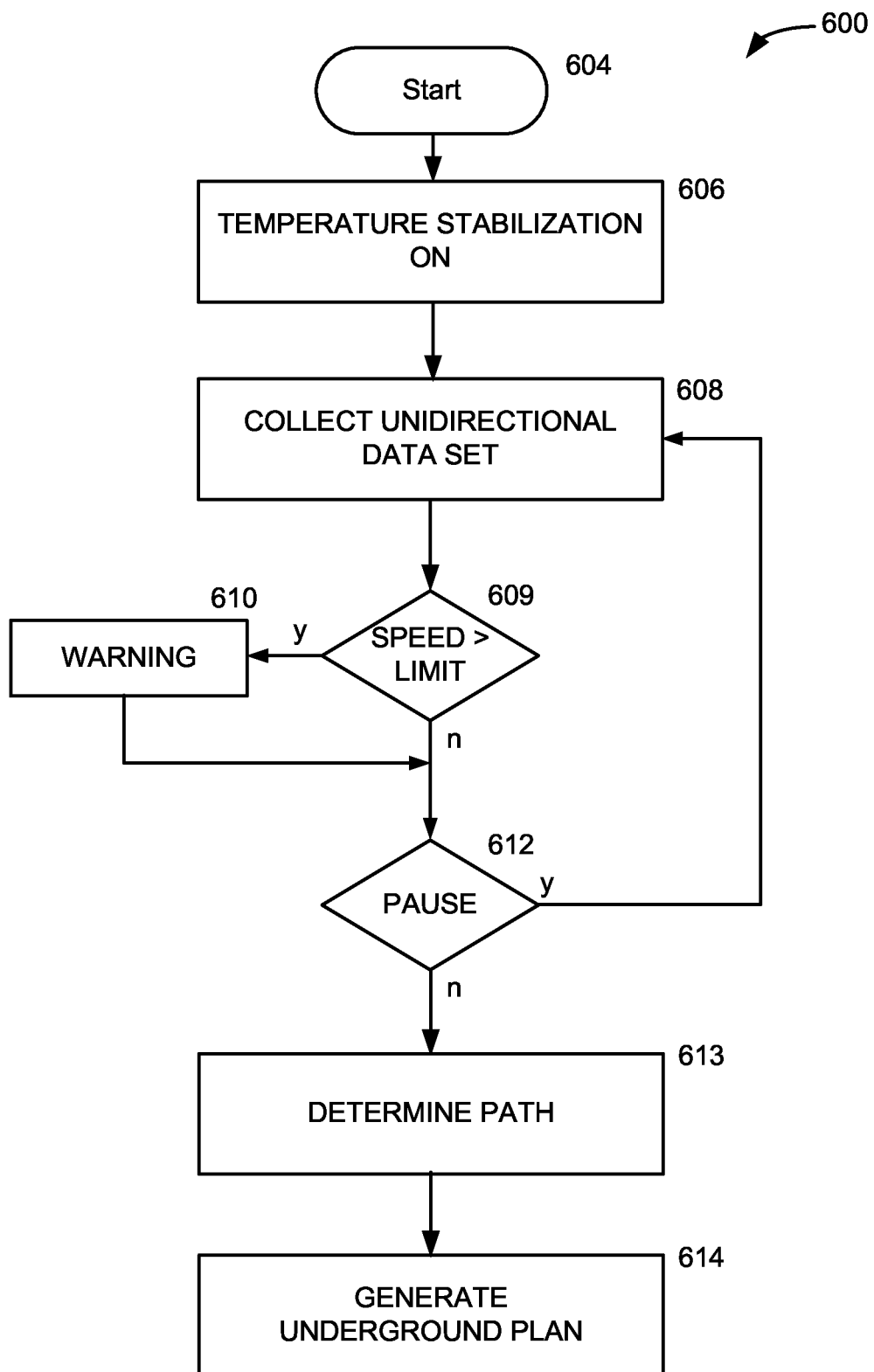

FIG. 9*a* is a flow diagram illustrating an embodiment of a method for developing an underground plan using the planning tool of the present disclosure.

Figure 9B:
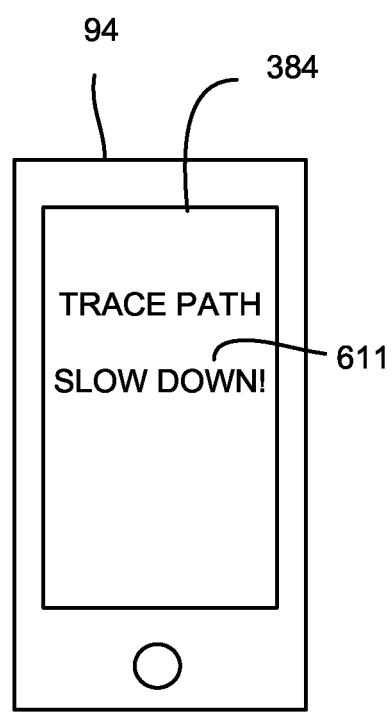

FIG. 9*b* is a screenshot illustrating the appearance of an embodiment of a screen showing an excess speed warning.

Figure 9C:
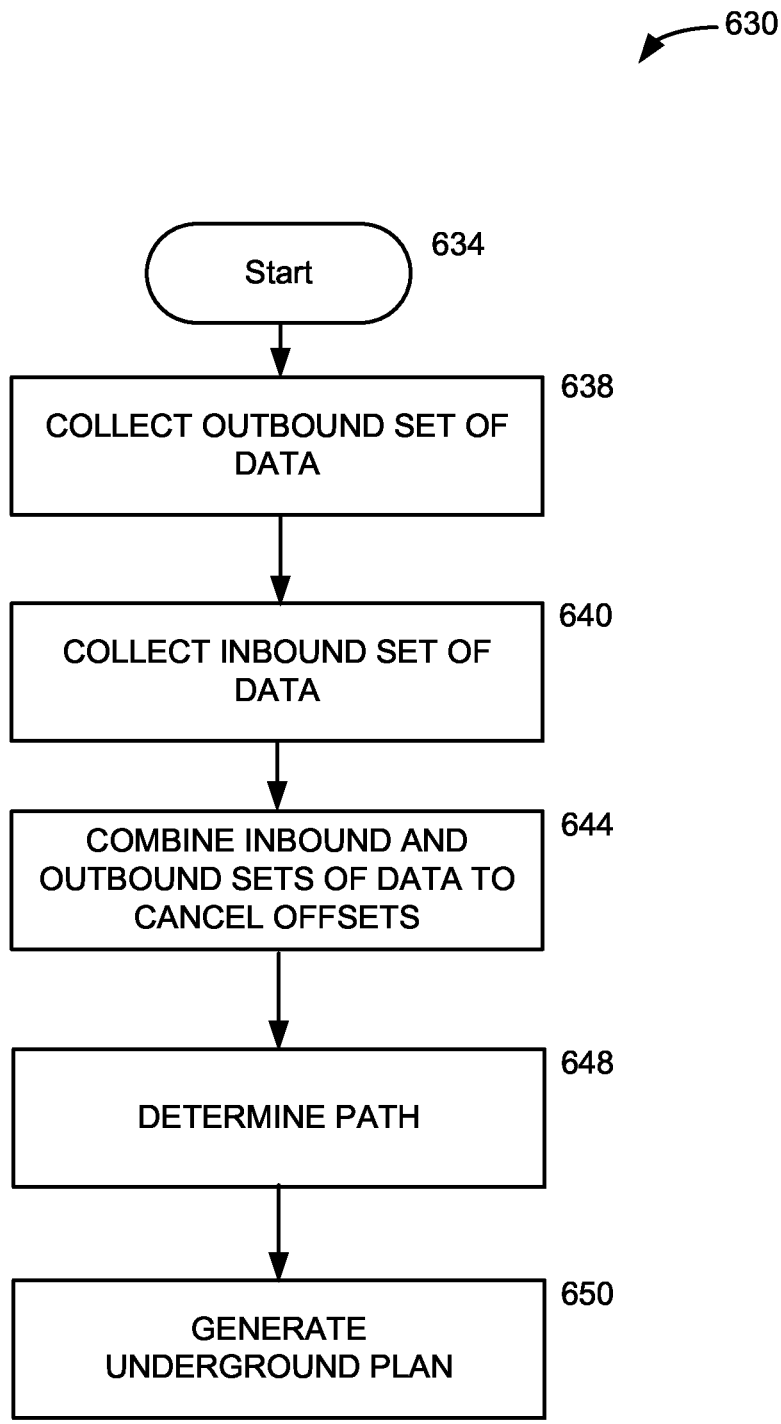

FIG. 9*c* is a flow diagram illustrating another embodiment for developing an underground plan using the planning tool of the present disclosure.

Figure 10:
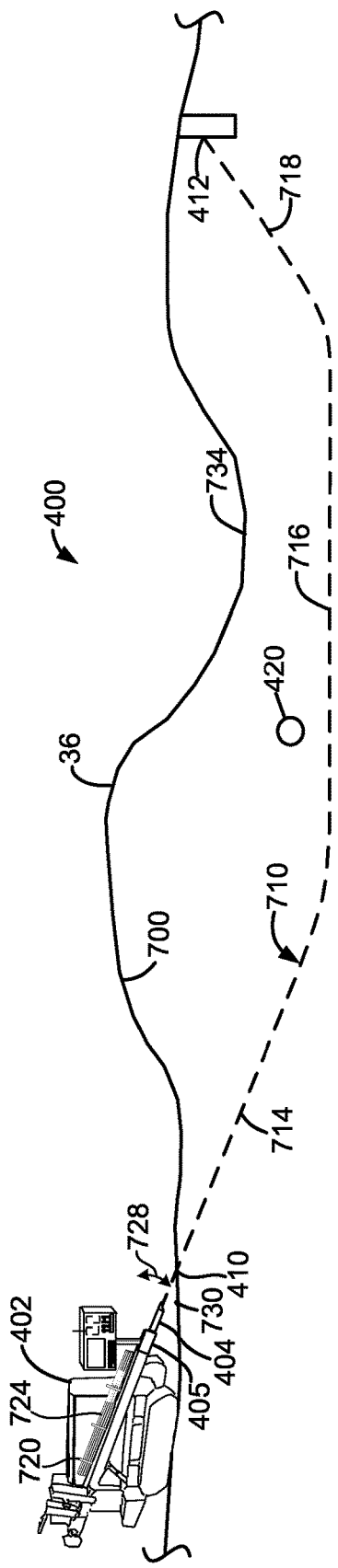

FIG. 10 is a diagrammatic view, in elevation, illustrating an underground plan developed based on actual path data sets collected responsive to FIGS. 7 and 8 and referenced to the surface topography.

Figure 11:
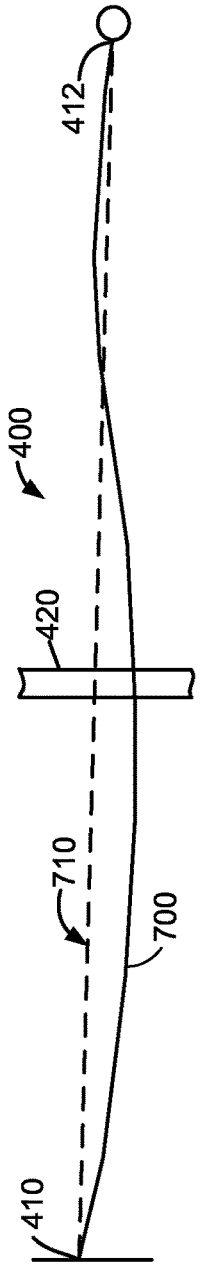

FIG. 11 is a diagrammatic overhead view of the bore plan of FIG. 10, illustrating curvature from the entry point to the exit point of the underground plan.

Figure 12:
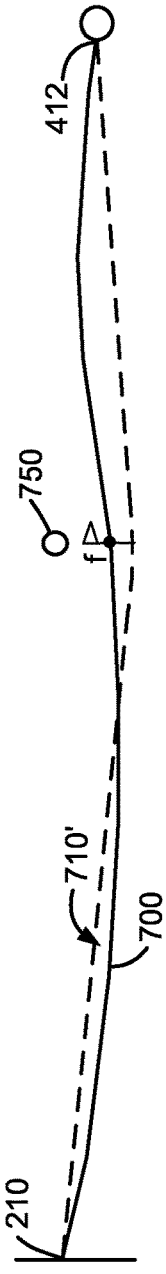

FIG. 12 is another diagrammatic overhead view showing a modified underground plan configured to avoid an obstacle.

Figure 13:
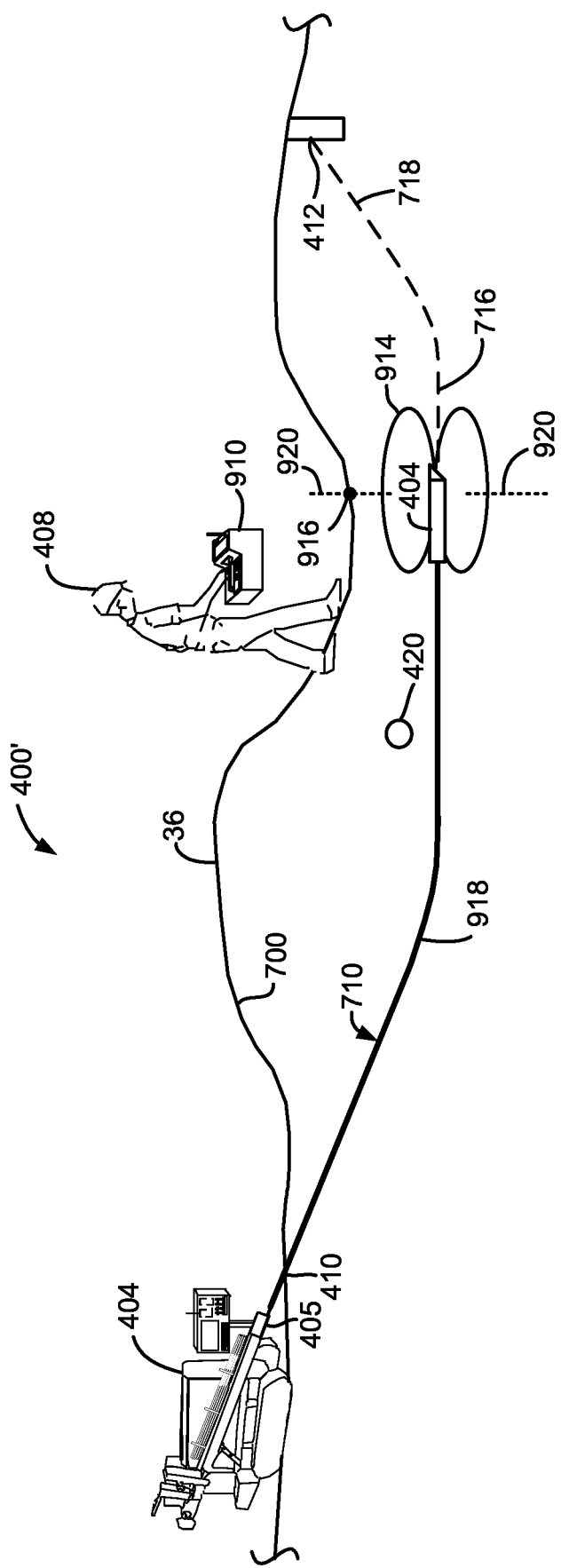

FIG. 13 is a diagrammatic illustration, in elevation, of a drilling operation in progress with a boring tool following the underground plan of FIG. 7 and an operator utilizing a walkover locator to confirm the progress of the boring tool.

FIG. 14 is a diagrammatic view, in elevation, illustrating an embodiment of a technique for determining a setback position for the drill rig from an entry position using the planning tool of FIGS. 1 and 2.

FIG. 15 is a diagrammatic view, in elevation, illustrating an embodiment of a technique for determining a setback position for the drill rig from an inground position using the planning tool of FIGS. 1 and 2.

Figure 16:
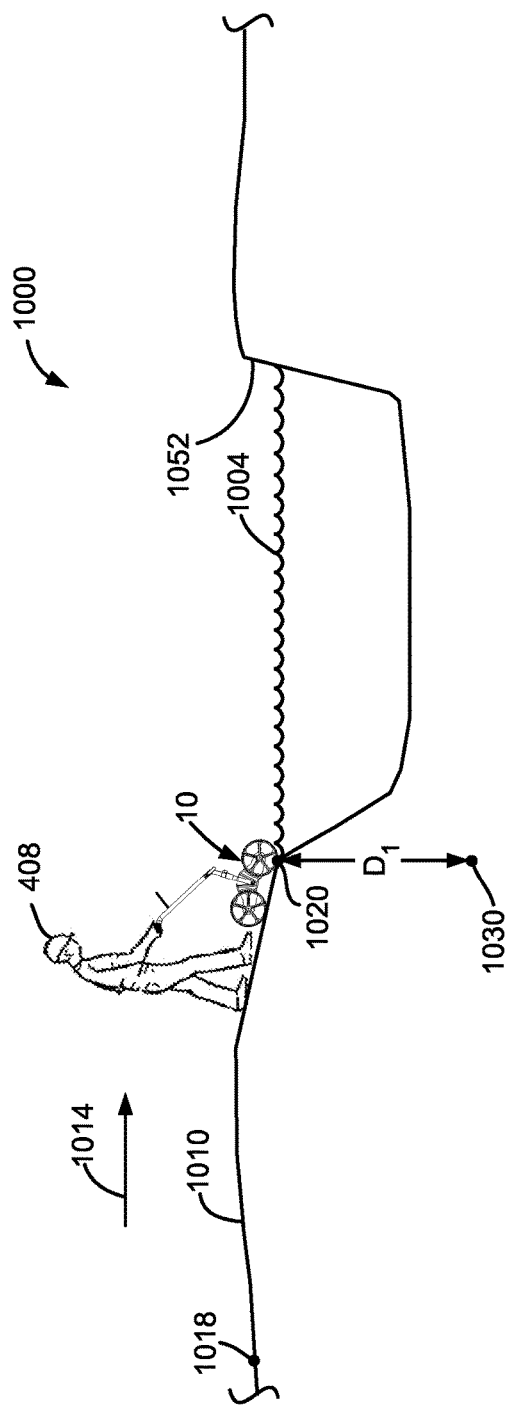
Figure 17:
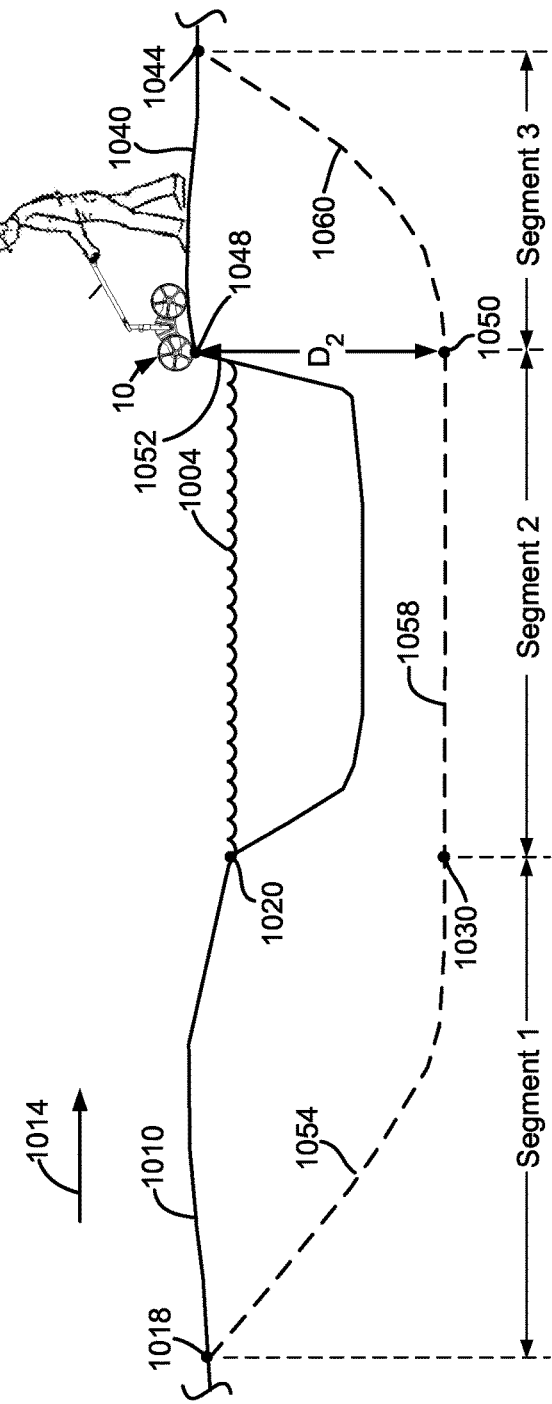

FIGS. 16 and 17 are diagrammatic views, in elevation, illustrating an embodiment of a technique for developing an inground plan involving an obstacle across which the planning tool cannot be rolled.

FIGS. 18 and 19 are diagrammatic views, in elevation, illustrating an embodiment of a technique for developing an underground plan in relation to a cliff using the planning tool of FIGS. 1 and 2.

Figure 20:
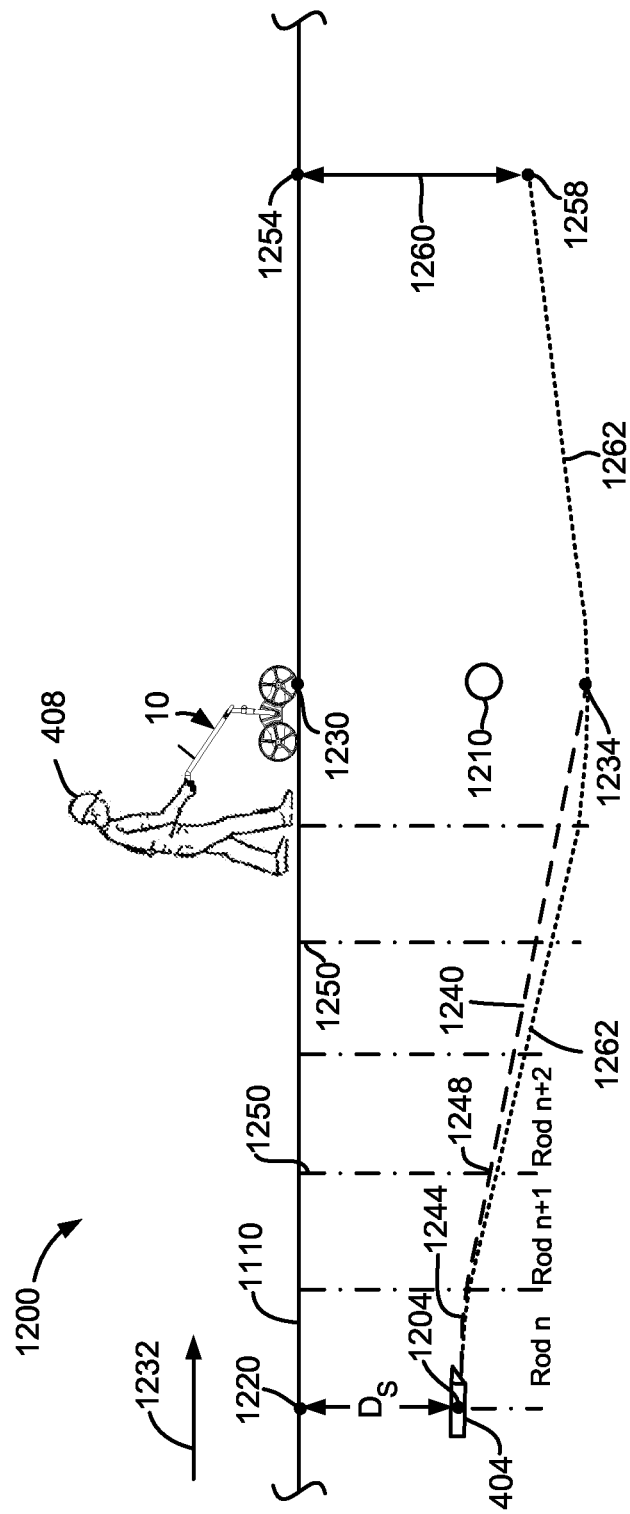

FIG. 20 is a diagrammatic view, in elevation, illustrating the use of the planning tool of the present disclosure to characterize an intermediate segment.

Figure 21A:
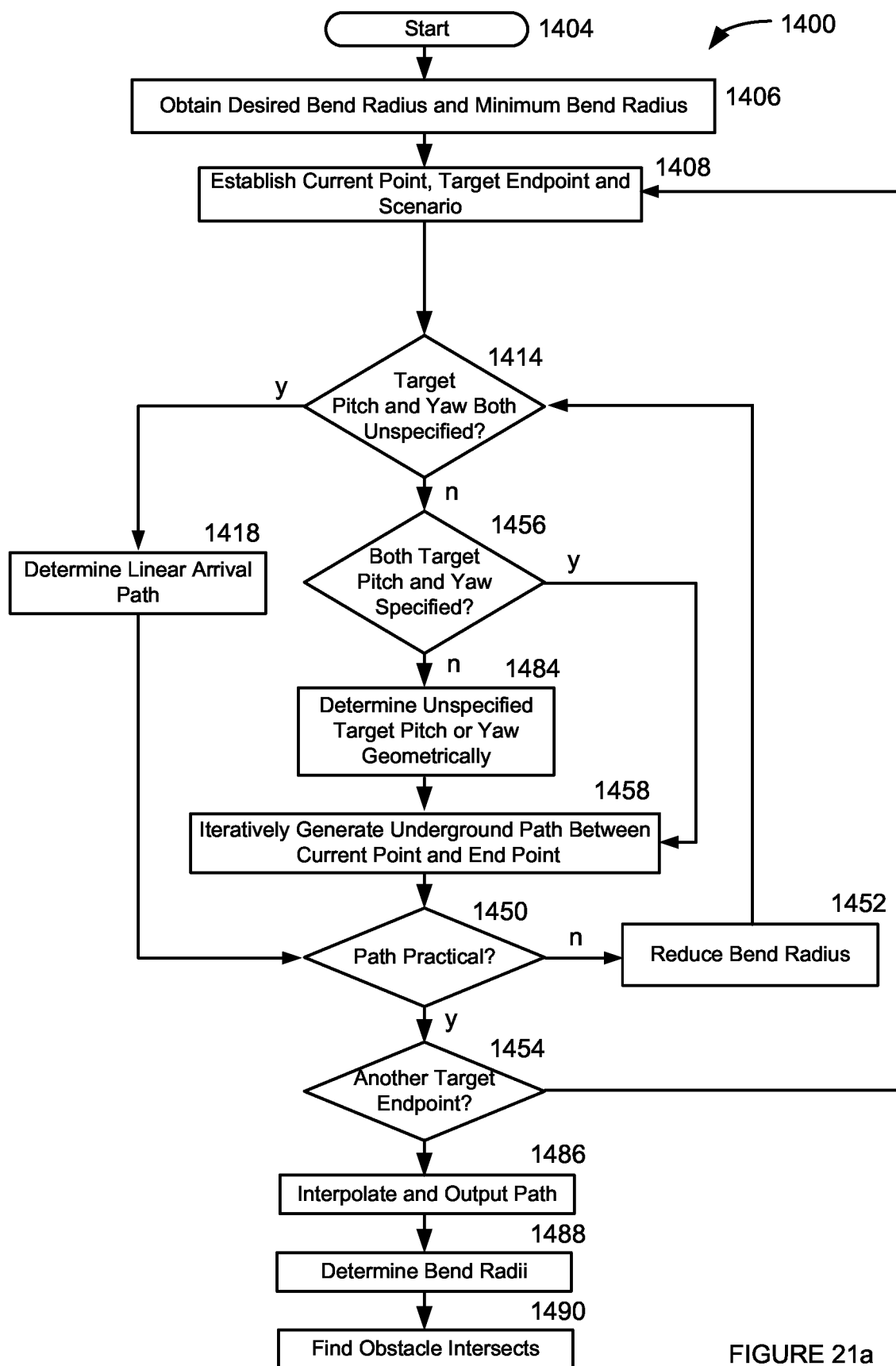

FIG. 21a is a flow diagram illustrating an embodiment of a method for the planning tool of the present disclosure to generate an inground path between a current point and a target endpoint.

Figure 21B:
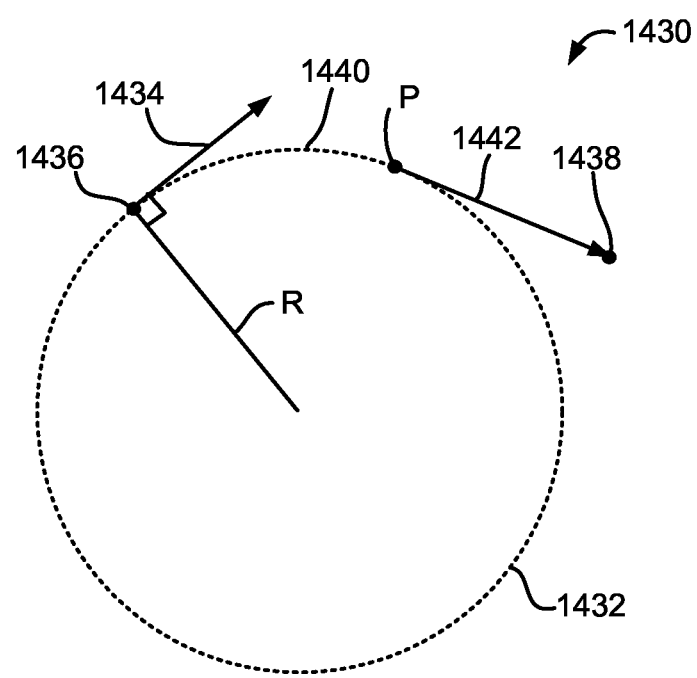

FIG. 21b is a diagrammatic illustration of an embodiment of a technique for forming a linear arrival path from a current position of the boring tool to a target endpoint.

Figure 21C:
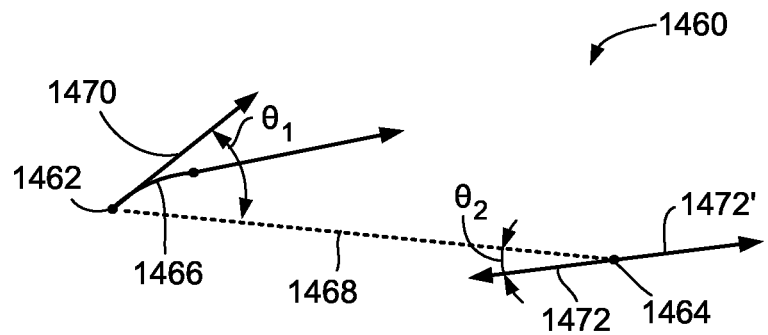
Figure 21D:
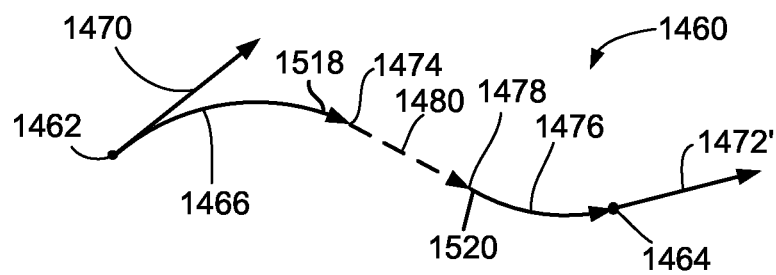

FIGS. 21c and 21d are diagrammatic illustrations of an embodiment of a technique for iteratively forming a section of an underground plan from a current position to a target endpoint with specified values for target endpoint pitch and yaw.

Figure 21E:
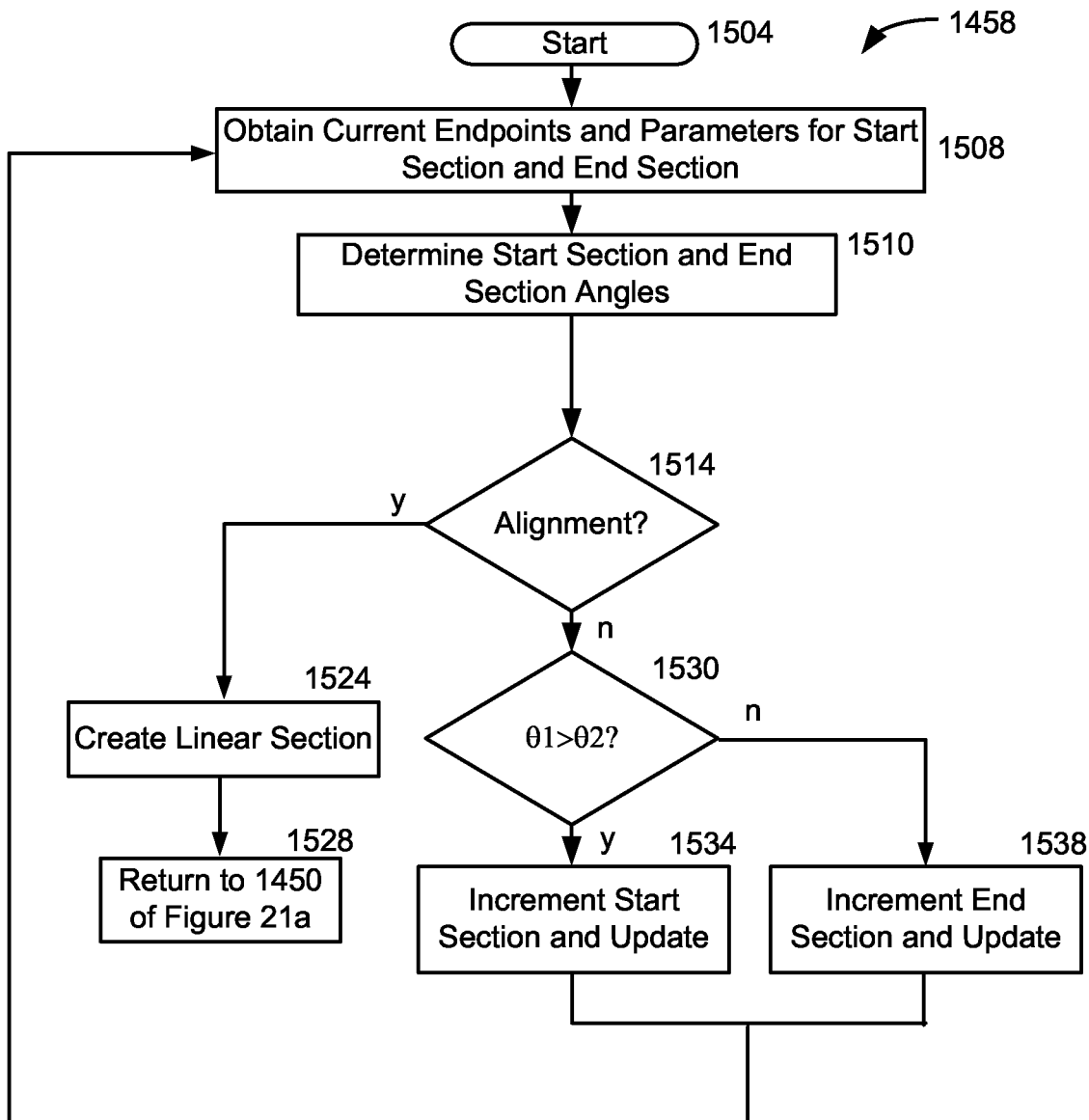

FIG. 21e is a flow diagram which illustrating an embodiment of a method for iteratively forming the section of the underground plan shown in FIGS. 21c and 21d.

Figure 21F:
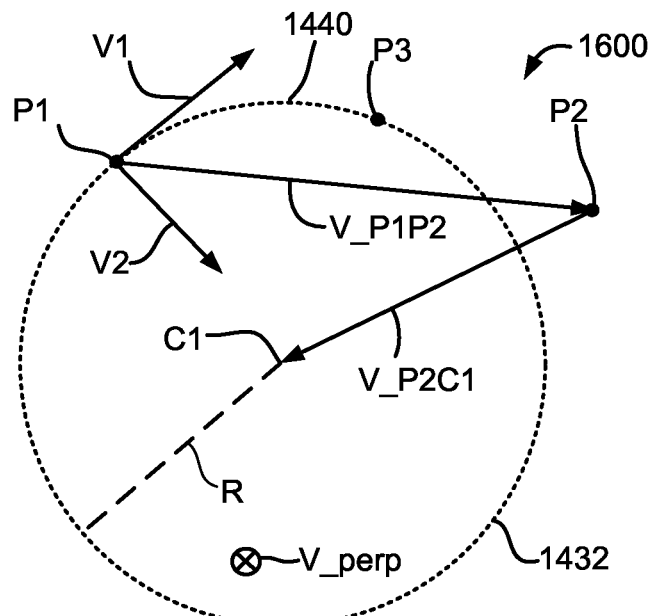
Figure 21G:
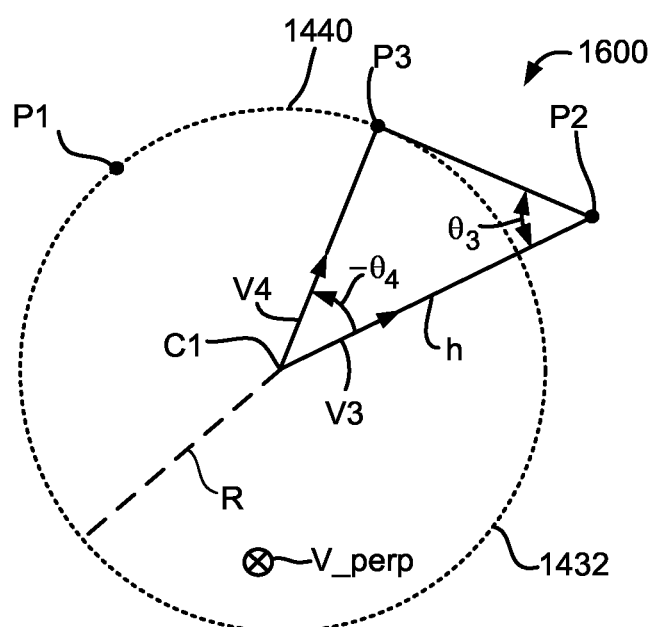
Figure 21H:
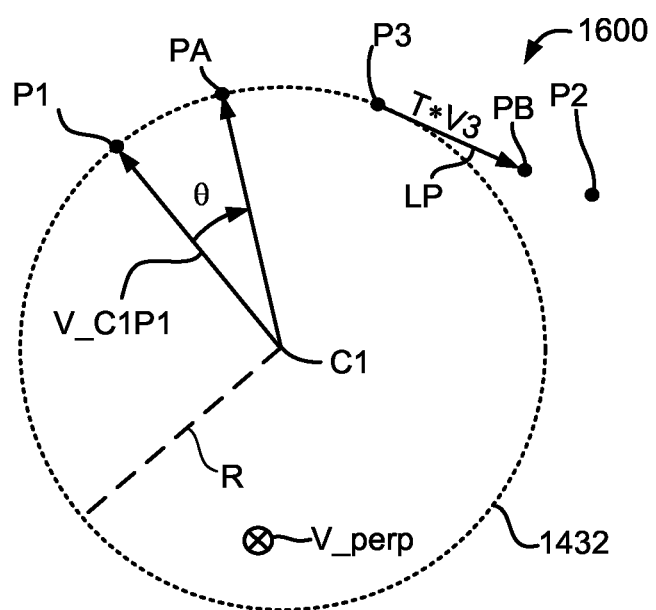

FIGS. 21f-21h are diagrammatic illustrations of details of an embodiment of path generation in which the arrival pitch and arrival yaw are not specified for a target position.

Figure 21I:
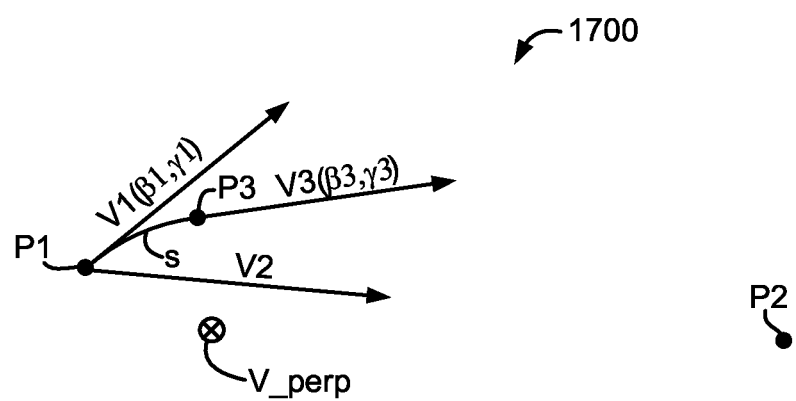
Figure 21J:
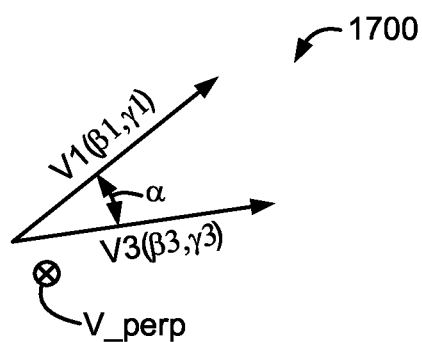

FIGS. 21i and 21j are diagrammatic illustrations of details of an embodiment of path generation in which both the arrival pitch and the arrival yaw are specified for a target position.

Figure 22:
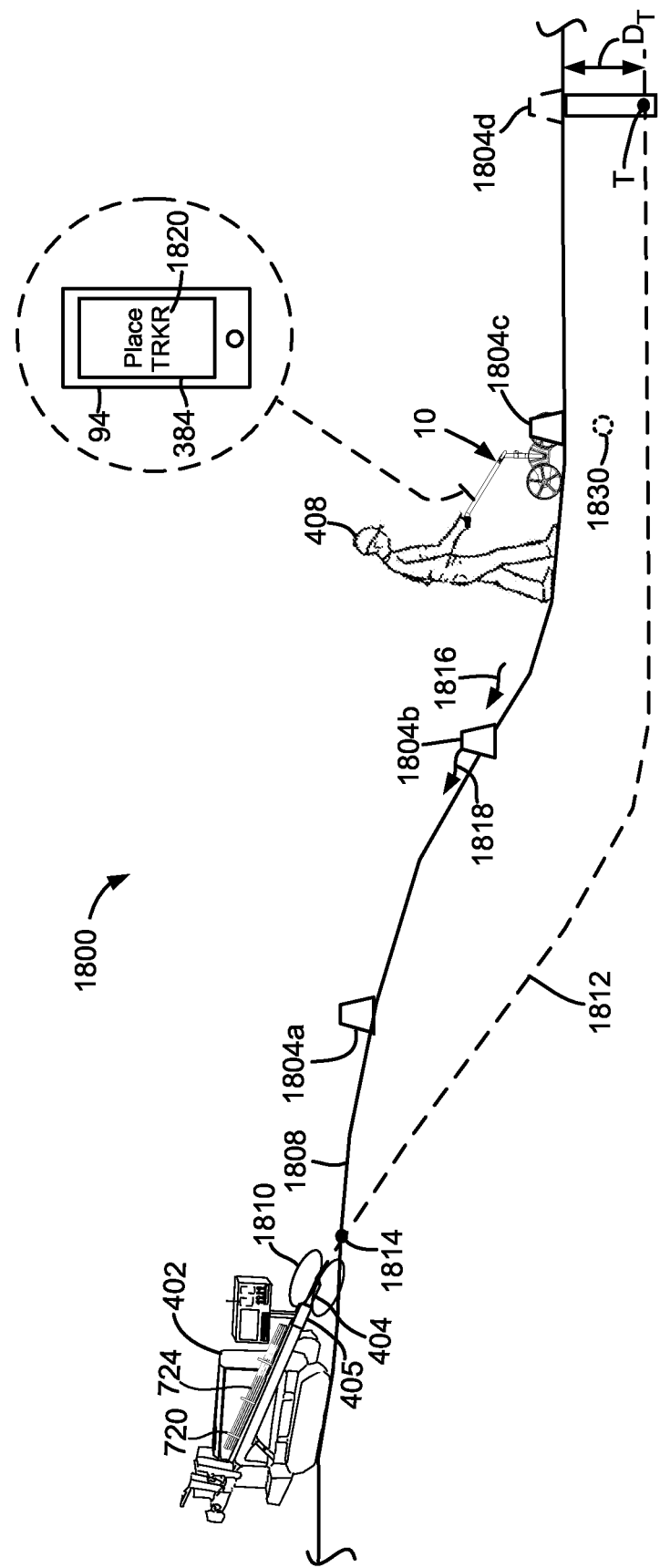

FIG. 22 is a diagrammatic view, in elevation, illustrating an embodiment of a system using the planning tool of FIGS. 1 and 2 for placing a plurality of trackers for subsequent use in guiding a boring tool.

Figure 23:
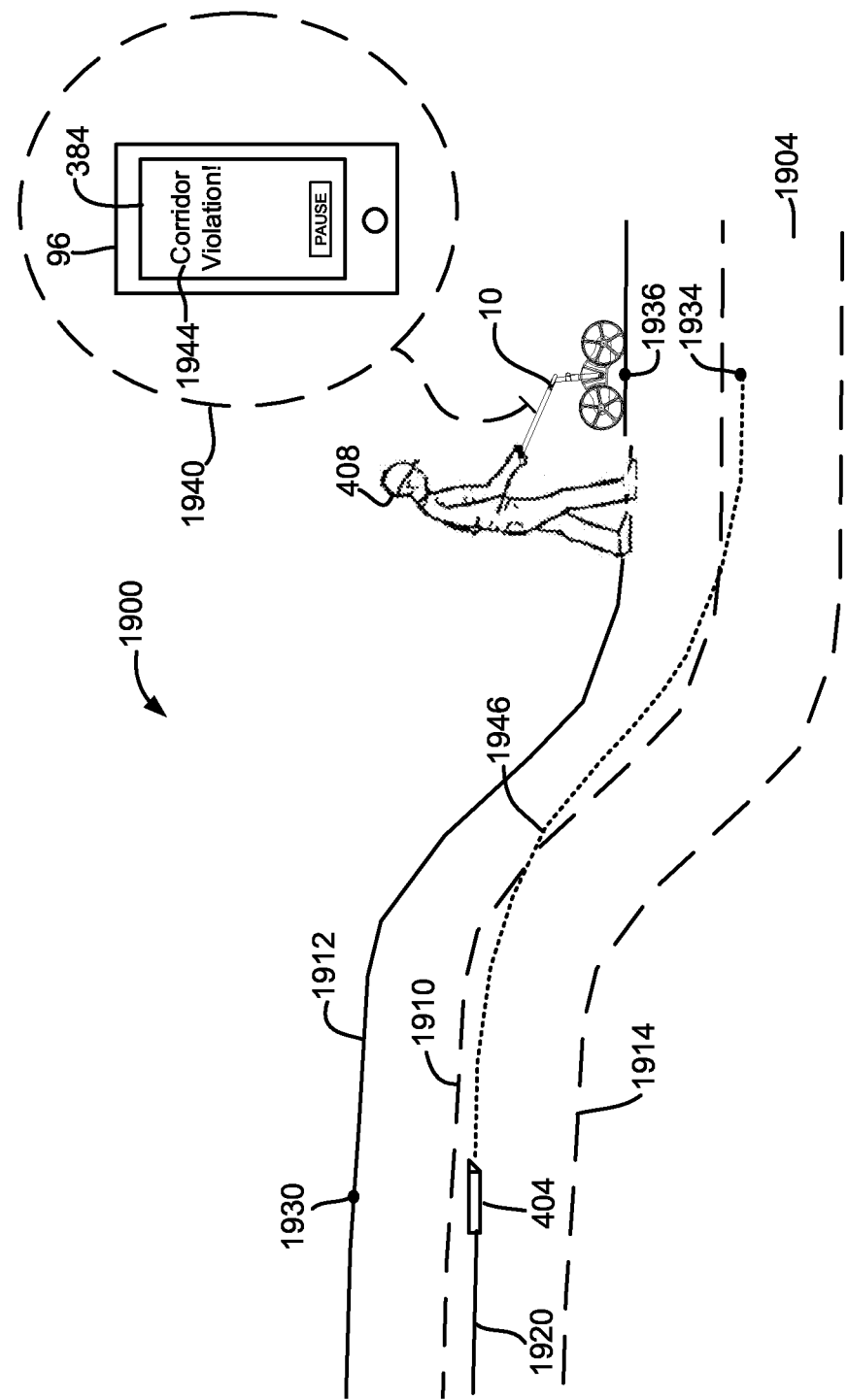

FIG. 23 is a diagrammatic view, in elevation, of a region in which an operator is designating an intermediate bore segment in relation to a utility corridor.

DETAILED DESCRIPTION

The following description is presented to enable one of ordinary skill in the art to make and use the invention and is provided in the context of a patent application and its requirements. Various modifications to the described embodiments will be readily apparent to those skilled in the art and the generic principles taught herein may be applied to other embodiments. Thus, the present invention is not intended to be limited to the embodiments shown, but is to be accorded the widest scope consistent with the principles and features described herein including modifications and equivalents. It is noted that the drawings are not to scale and are diagrammatic in nature in a way that is thought to best illustrate features of interest. Descriptive terminology may be adopted for purposes of enhancing the reader's understanding, with respect to the various views provided in the figures, and is in no way intended as being limiting. As used herein, the term "bore plan" refers to a complete path extending underground from an entry position into the ground, to an exit position. The term "bore segment" refers to a partial underground path that is insufficient to make up a bore plan such as, for example, an initial entry path for entrance of the boring tool into the ground or an intermediate portion of an overall underground path. A bore segment does not necessarily include either the entry position or the exit position. For purposes of the present disclosure and the appended claims, the term "underground plan" encompasses both a bore plan and a bore segment.

As will be seen, the present disclosure brings to light an advanced planning tool for underground drilling that is highly adaptable to the dynamic nature of horizontal directional drilling jobsites. This advanced planning tool is a single, stand-alone instrument. Embodiments of the planning tool can quickly generate (1) underground plan guidance to a target point, and/or around an obstacle, from any point along a bore path with or without a bore plan, (2) modifications or deviations to existing bore plans in real time during drilling, in each case in order to easily and flexibly cope with unexpected obstacles and topography that are encountered during an ongoing underground drilling operation and/or (3) guidance on an as-needed basis for any desired portion of a drill run in order to address some technical drilling challenge that has been encountered. The advanced planning tool further provides for generation of an overall bore plan immediately prior to the start of the drilling operation in real time with no need for a professional survey. As will be seen, there is no requirement for a drill rig to be present during the development of the underground plan, although the planning tool conveniently provides for the rapid and convenient on-site development of the underground plan with deployment of all the system components in a single delivery such that there is little, if any, down time for the drill rig.

Turning now to the drawings, wherein like items may be indicated by like reference numbers throughout the various figures, attention is immediately directed to FIGS. 1 and 2, which are diagrammatic views, in perspective, of an embodiment of a planning tool or measurement instrument generally indicated by the reference number 10 and produced in accordance with the present disclosure. FIGS. 1 and 2 are taken from the rear of tool 10 to show its opposite sides. Tool 10 can include a primary wheel 20 and a following wheel 24 each of which is supported on a respective axle for rotation about first wheel axis 28 and a second wheel axis 30. The wheel axes are at least generally parallel and spaced apart with respect to a direction of travel such that the primary wheel and the following wheel rotate in-line with the following wheel directly behind the primary wheel. Stated in another way, the primary wheel and the following wheel rotate in a common center plane 32 which is identified by a centered dashed line on the periphery of primary wheel 20 in FIG. 1. It is noted that each wheel includes a tread or tire 34 that is formed from a suitable resilient material such as, for example, urethane. The tread can be stretched to some extent to insure retention on each wheel. From side-to-side, each tire, as supported, can be flat or nearly flat, although this is not a requirement. In other words, there is no crown formed from side-to-side of each tire. In this way, the wheels track relatively straighter and the rolling diameter of each wheel does not change with side-to-side tilt of the planning tool to stabilize the wheel diameter with tilt. The axles are supported by a housing 36, yet to be described. In the present embodiment, both wheels are of an equal diameter such that each wheel responds essentially identically to the terrain over which it passes including curbs, railroad tracks, parking dividers, speed bumps and other such irregularities. In other embodiments, the following wheel can be of a different diameter than the front wheel. In still other embodiments, the following wheel can be supported to pivot about a vertical axis 38, as indicated by a double-headed arrow 40, such that the vertical axis can be in the center plane of the following wheel. It is noted that the use of two wheels is not a requirement. In other embodiments, following wheel 24 can be eliminated or replaced by some other element for contacting the surface of the ground such as, for example, a skid.

Still referring to FIGS. 1 and 2, a handle assembly 50 includes a pivot post 54 that is pivotally supported on a shaft 58 such that the handle assembly can rotate in an angular range about an axis 59 between a forward bumper 60*a* and a rear bumper 60*b*. As will be seen in a subsequent figure, pivot post 54 automatically rotates between bumpers 60*a* and 60*b* during topographic terrain tracking which serves to maintain the wheels in contact with the surface of the ground in conjunction with other features of the handle assembly. These bumpers can be defined by a middle cover 70. A telescoping tube 74 is slidingly received in an uppermost end of pivot post 54. A friction clamp 78 can be selectively latched to lock the position of the telescoping tube in the pivot post. A hinge 80 is received between telescoping tube 74 and a handle extension 84. The latter includes a distal or free end that defines a handle 86 for engaging the hand of an operator. Hinge 80 includes a latch handle 88 for selectively locking the rotational orientation of handle extension 84 relative to telescoping tube 74 in an angular range 90 that is indicated by a double-headed arcuate arrow. The operator can customize the handle assembly adjustments of unit 10 to his or her preferences. These adjustments can be made or changed at any time including in view of the topography of the terrain over which the unit is passing in order to maintain continuous contact of each of the primary wheel and the following wheel with the surface of the ground in conjunction with automatic rotation of pivot post 54. When the operator encounters a curb 85 or other obstacle with a steep profile or vertical face, the operator can rotate handle 86 which initially rotates the handle assembly into contact with bumper 60*b*. Continued tilting then causes primary wheel 20 to rise vertically until the upward transition to pass over curb 85 is complete. The present embodiment, with primary and following wheels of the same diameter, provides for a clearance that spaces the housing (between the primary wheel and the following wheel) away from a level surface by at least 5.5 inches.

Handle extension 84, in the present embodiment, includes a mount 92 for supporting a smartphone or tablet 94, although this is not a requirement. A camera 95 (FIG. 2) can also be provided supported by telescoping tube 74, or any other suitable component, having a field of view in front of the planning tool. The camera can generate still images and/or video. In some embodiments, the role of the camera can be fulfilled by a built-in camera which forms part of smart device 94. A trigger 96 can be provided adjacent to handle 86 or elsewhere to serve as a user interface for receiving operator inputs. It is noted that any suitable type of input device can be used including but not limited to a button switch, top hat switch, joystick and touch pad. The trigger can be used to initiate various functions such as, for example, marking entry and exit points, waypoints and obstacles, as well as pausing data gathering in order to transition across some sort of obstacle such as, for example, a river, cliff or highway to resume data collection on an opposite side of the obstacle. Stitching of bore segments created in this way will be discussed at an appropriate point below. As best seen in FIG. 2, a power button 100 provides for turning the unit on and off, while a kickstand 104 provides convenient support in a down position. Of course, the kickstand is rotatable to a raised position when the unit is in use.

Referring to FIGS. 3*a* and 3*b* in conjunction with FIGS. 1 and 2, further details with regard to housing 36 will now be provided. FIGS. 3*a* and 3*b* are partially cut-away diagrammatic views of both sides of an embodiment of a frame 120 which forms part of housing 36 in FIGS. 1 and 2. In this embodiment, the frame defines an outer sidewall 124. A first panel 130 (FIG. 1) is mounted to a peripheral surface 134 (FIG. 3*a*) that is transverse to and delimits one side of outer sidewall 124 and is transverse thereto. The first panel can be removably attached using suitable fasteners such as, for example, threaded fasteners. A second panel 140 (FIG. 2) is mounted to a peripheral surface 144 (FIG. 3*b*) that is spaced apart from outer sidewall 124 by a rim 148 on an opposite side of frame 120 with respect to first panel 130. Like the first panel, the second panel can be removably attached, for example, using suitable fasteners. Seal grooves 150 can be defined around the periphery of the opposing openings of the frame for purposes of receiving a suitable seal or gasket (not shown). Opposite outer sidewall 124, frame 120 can reduce in thickness, for example, in one or more steps 158 to a central web 160, as seen in FIGS. 3*a* and 3*b*. Frame 120 can be formed from any suitable material such as, for example, aluminum or plastic using any suitable techniques such as, for example, extrusion or molding.

Attention is now directed to FIG. 4 in conjunction with FIGS. 1, 2, 3*a* and 3*b*. The former is an elevational view diagrammatically illustrating the side of housing 36 that receives first panel 130 (FIG. 1). It is noted, however, that first panel 130, middle cover 70, wheels 20 and 24, handle assembly 50 and shaft 58 have been rendered as transparent in the view of FIG. 4 for purposes of illustrative clarity. Kickstand 104 has also been rendered as transparent although a kickstand mount 159 is visible. A primary bearing hub 160 includes a primary axle 164 that is supported for rotation. A dowel pin 166 extends through axle 164 and engages complementary holes in primary wheel 20 when the latter is received on the primary axle. A rear hub 170 supports a rear axle 174 for rotatably receiving following wheel 24. It is noted that primary bearing housing 160 and rear hub 170 can be mounted in any suitable manner. In the present embodiment, blind aluminum standoffs and cap screws have been used such that the primary hub and rear hub are captured between first panel 130 and second panel 140. As seen in FIG. 2, second panel 140 surrounds a battery compartment 180. The battery compartment includes a removable lid 184. In the present embodiment, battery compartment 180 is mounted to second panel 140 using suitable fasteners. In FIG. 4, a major wall of the battery compartment has been rendered as transparent to reveal a battery 186 that is made up of six size C cells that can power the unit in the present embodiment. It is noted that inter-component electrical cabling has not been shown for purposes of illustrative clarity, but is understood to be present.

A printed circuit board 200 is seen in FIG. 4 as being supported by a pair of board mounts 204 that are themselves supported by first panel 130, for example, using blind aluminum standoffs and threaded fasteners. Mounts 204 can be formed from a material that isolates board 200 from mechanical shock as well as mechanical stress and/or movement and bending that can be induced when the first panel, or other structure to which the mounts are attached, has a coefficient of expansion, responsive to temperature, that is different than the coefficient of expansion of the printed circuit board. For example, the printed circuit board will not tilt out of the orientation shown from front to back responsive to temperature induced movement and bending will not take place. The mounts support board 200 such that an accelerometer 210 is located at a position that is at least approximately centered along a dashed line 212 that extends between first wheel axis 28 and second wheel axis 30. In this way, accelerometer 210 receives essentially the same input accelerations responsive to primary wheel 20 passing over a terrain irregularity as the input accelerations received responsive to the following wheel subsequently passing over the same terrain irregularity. In an embodiment, accelerometer 210 can be a single axis accelerometer such as, for example, a MEMS accelerometer having a sensing axis that is arranged at least approximately parallel with or on dashed line 212. In this orientation, the output of the accelerometer should be zero when dashed line 212 is level. In other embodiments, a multi-axis accelerometer such as, for example, a MEMS triaxial accelerometer can be used. Given that accelerometers can exhibit offsets and/or nonlinearity, compensation can be applied to correct the accelerometer output. It is noted that these output irregularities can vary from one accelerometer to another, even for the same part number. There can also be misalignments introduced between the accelerometer and planning tool 10 itself. Such misalignments can arise between the accelerometer and the printed circuit board on which it is supported, as well as between the printed circuit board and the frame of the planning tool. Accordingly, a calibration can be performed to characterize each accelerometer and its mounting alignment, for example, by supporting the planning tool on a test stand that provides a precise, but adjustable support platform such that the accelerometer output(s) can be measured with the planning tool at different pitch (i.e., front-to-back) and roll (i.e., side-to-side) orientations. Based on the measured accelerometer outputs, suitable compensation can be applied. One such suitable form of compensation is piecewise linear compensation which can provide compensation over a range of pitch and roll angles.

One embodiment can receive accelerometer 210 within an interior cavity of an oven 214 that includes temperature regulation to enhance the stability of the accelerometer readings which are typically temperature dependent, as will be further described. Oven 214 can include an insulated housing and/or supplemental surrounding insulation to protect surrounding components, as well as the printed circuit board that supports the oven, from excessive heat. The oven, for example, can be a crystal oven.

Referring to FIG. 5 in conjunction with FIG. 4, the former is a diagrammatic, partially cutaway view illustrating primary axle 164 with primary hub 160 (FIG. 4) rendered as transparent to reveal an encoder wheel 230 that co-rotates with the primary axle. While only the primary wheel is monitored by an encoder in the present embodiment, in other embodiments, an encoder can be associated with each wheel. The encoder wheel includes encoder marks 234 that can be uniformly distributed about the axis of rotation of the primary axle. An optical reader 240 serves as an encoder that is fixedly mounted to read encoder marks 234 to generate an encoder output 244. In an embodiment, the optical reader can be a quadrature encoder that generates a pair of pulse trains 248 that are designated as Bit 0 and Bit 1 wherein Bit 0 leads Bit 1 by 90 degrees responsive to co-rotation of encoder wheel 230 in the forward direction. For forward rotation and by way of non-limiting example, the (Bit 0, Bit 1) output sequence is (0,0); (1,0); (1,1); (0,1). For rotation in the reverse direction, the output sequence is reversed: (0,0); (0,1); (1,1); (1,0). By identifying the sequence, the direction of rotation is identified. Using either the Bit 0 or Bit 1 pulse train, the rate of rotation of primary wheel 20 as well as distance rolled is characterized with a high degree of accuracy. In an embodiment, successive pulses in either pulse train, which may be referred to as counts, can correspond to incremental movements of 0.03 foot or less per count on the surface of the ground. A time interval, I, can be monitored from one count to the next. Of course, the amount of movement per count divided by I is equal to the velocity over the ground for any given count. It is noted that any suitable type of sensor or reader can be used and is not limited to an optical embodiment including, but not limited to a Hall effect sensor or magnetic sensor. Successive pulses in the Bit 0 or Bit 1 pulse train indicate that the primary wheel has traveled a known distance over the surface of the ground such that monitoring the counts in either pulse train provides for generating an odometer output. During continuous movement over smooth terrain at a constant velocity with primary wheel 20 in continuous contact with the ground, both pulse trains exhibit a pulse output at a fixed frequency and pulse width. Responsive to movement that is not continuous or the primary wheel spinning out of contact with the ground, however, both pulse trains will vary in frequency and pulse width. As will be seen, the optical reader output can be correlated with the output of accelerometer 210 to compensate for unsteady movement or operator induced changes in the rate of movement across the surface of the ground.

Referring to FIG. 4, a main printed circuit board 300 includes a processor 310 and memory 314 to provide sufficient computational power for the operation of planning tool 10. Processor 310 receives the output of accelerometer 210 as well as the output from optical reader 240 and from power switch 100. In the present embodiment, main board 300 can support an atmospheric pressure sensor 320, a GPS module 324 having a suitable antenna, a communication module 328, and a noise receiver 330 each of which is electrically coupled to processor 210. In an embodiment, GPS 324 can provide a precision output that can be accurate, for example, to about 1 cm for longitude/latitude and 1.5 cm for elevation. GPS 324 can identify a start position to processor 300 which can then index subsequent GPS positions against distance traveled by the planning tool, although the GPS module is not required. The output of atmospheric pressure sensor 320 is indicative of elevation which can serve as an input for purposes of generating topographic details. For example, stitching path segments together to form an overall path on the surface of the ground can be based on the elevation of the endpoints of the path segments adjacent to an obstacle. Communications module 328 can be in wireless bidirectional data communication with tablet or smartphone 94, for example, via a Bluetooth or other suitable connection, as will be further described.

In another embodiment which includes a precision GPS, planning tool 10 can selectively operate in a GPS mode or a measurement mode. In one optional configuration, the GPS mode can be a default mode, with the measurement mode as a backup when GPS is not available or usable, for instance when the GPS cannot read a sufficient number of GPS satellites due to adverse weather conditions, buildings, terrain and/or other factors which may limit or block access to satellite signals, or when the measurement mode otherwise provides benefits over the GPS mode. In the GPS mode, the planning tool does not require use of the output of optical encoder 240 such that the movement of the planning tool, and thereby the path that it follows, is characterized primarily based on the output of the precision GPS. In the measurement mode, the output of optical encoder 240 and other suitable sensors serves as the primary source for characterizing the movement of the planning tool and thereby the path that it follows. Switching between the GPS mode and the measurement mode can be accomplished manually based on an operator selection and/or automatically. With regard to the latter, processor 310 can monitor the accuracy of the GPS output in any suitable manner such as, for example, determining the number of GPS satellites that the precision GPS is currently receiving signals from (i.e., locked with). If the GPS resolution becomes too low, for example, based on a threshold minimum number of satellites, the system can switch to the measurement mode. In one optional configuration of the measurement mode, GPS data (when available) can be used to augment the measurement mode data, serving as a crosscheck for extra accuracy/reliability. If the resulting difference between the two outputs based on a crosscheck exceeds some amount, for example, based on a threshold, an indication can be provided to the operator or the operator can be instructed to return to the last GPS position at which the GPS mode data output and the measurement mode data output are consistent or do not violate the threshold. In an embodiment, the planning tool can switch to GPS mode when accelerometer readings indicate that the surface along which the planning tool is rolling is so rough that it is likely that the primary wheel is, at least at times, losing contact with the surface.

FIG. 6a is a block diagram that illustrates an embodiment of the components of planning tool 10. Trigger 96 and power switch 100 can be interfaced with processor 310. Atmospheric sensor 320, GPS 324, communications module 328 and a sensor package 340 are also in electrical communication with processor 310. Noise receiver 330 can include a suitable antenna 332 such as, for example, a triaxial antenna. In this way, noise measurements can be taken across a spectrum of interest and/or at specific frequencies of interest. Spectral noise measurements can be based, for example, on a time domain to frequency domain transform such as a Fast Fourier Transform (FFT). Suitable noise measurement techniques are described, for example, in commonly owned U.S. Pat. No. 8,729,901 (hereinafter the '901 patent) and U.S. Pat. No. 9,739,140 (hereinafter, the '140 patent) as well as U.S. Published Patent Application no. 2019/0003299 (hereinafter the '299 application), each of which is hereby incorporated by reference. In the present embodiment, motion sensor package 340 includes accelerometer 210 within oven 214. A control line 342 allows processor 310 to at least turn oven 214 on and off while the processor receives readings from the accelerometer on a line 344. In another embodiment, the sensor package can include one or more of a triaxial magnetometer, at least one triaxial MEMS accelerometer and at least one triaxial gyro such as a triaxial MEMS rate gyro. A triaxial magnetometer provides the magnitude and direction of the Earth's magnetic field to characterize the yaw orientation or heading of unit 10. Outputs of a triaxial rate gyro can be integrated to provide an attitude and heading of the unit. In still another embodiment, an integrated Inertia Measurement Unit (IMU) can serve as sensor package 340. Such an IMU can replace accelerometer 214 in the oven. A suitable wireless connection 380 such as, for example, a Bluetooth connection can be made with smartphone or tablet 94 that is running a custom app 384. In one feature, app 384 displays a measured topography 386 in real time, at least from the perspective of the user, as the user rolls the wheel along the surface of the ground. This allows the user to confirm that data is being collected as the path extends and provides the user with the opportunity to confirm that the measured topography appears consistent with the actual path.

Camera 95 can be interfaced with app 384. For example, at an entry point, an exit point, each time the operator designates a waypoint and when a utility is identified, camera 95 and/or smart device 96 can capture a still image to be stored with that position. In some embodiments, live video can be provided to processor 310 for purposes of recording and/or performing any suitable form of video processing either currently known or yet to be developed. For example, processing can be applied to identify the color and shape of markings such as, for example, paint markings that have been applied to the surface of the ground by a utility surveyor and/or the drilling crew. These markings can be recognized and populated into an underground plan, for example, along with a waypoint. The user can be prompted to add additional information with regard to a recognized marking. For example, if the marking identifies an underground utility, the user can be prompted to enter a depth if a value was not automatically recognized. Once an underground plan is generated, stored images can be displayed in association with waypoints, utilities and other positions. As another example, processing can be applied to determine the surface texture of the ground ahead of the planning tool. This surface texture can then be used for purposes of establishing a speed limit, yet to be described.

The output from optical wheel sensor 240 is used to measure the distance that primary wheel 20 is rolled along the surface of the ground as well as the rate of rotation and, hence, velocity of the planning tool on a per count basis from optical encoder 240 given that each count is associated with a time interval. The direction of rotation can also be identified, as discussed above. The rate of change in velocity from one count to the next corresponds to acceleration. Accordingly and given that each count corresponds to the same distance of travel of the wheel, acceleration is proportional to a difference in time, $\Delta t$, from one count to the next. If $\Delta t$ is zero, the velocity is constant. On the other hand, if $\Delta t$ is non-zero, the movement is not constant such that an accelerometer that is sensitive to this movement will produce a movement induced transient output at least potentially resulting in a mischaracterization of the surface topography. Compensation for such transients can be applied in any suitable manner. In an embodiment, an accelerometer compensation, AC, for a given accelerometer reading is determined based on the expression:

$$AC = k \cdot \Delta t \qquad \text{Equation A}$$

Where $\Delta t$ is described above and the amount of compensation to be applied is proportional to $\Delta t$. A compensated accelerometer output, CAO, for the given accelerometer reading is produced according to:

$$CAO = AO - AC \qquad \text{Equation B}$$

Accordingly, compensation AC is subtracted from the accelerometer output AO to yield CAO which is then used to characterize the surface. As will be seen, coefficient k can be determined iteratively, for example, by setting the coefficient to an initial value and then rolling the planning tool with an equal number of periods of slowing down and speeding up across a level surface. With an appropriate value for k, the movement induced accelerations will cancel such that the topography will be indicated as level after crossing the level surface. If the topography is not indicated as level, the coefficient can be adjusted and the calibration process is repeated iteratively until the topography converges on level.

FIG. 6b is a flow diagram that illustrates a non-limiting embodiment of a calibration technique for determining the value of k for a given planning tool, generally indicated by the reference number 388. The method begins at 390 and moves to 391 which sets the initial value of k to zero. Operation then proceeds to 392 in which the planning tool is rolled across a level surface along a straight line such as, for example, a level interior floor of a building subject to operator induced accelerations and decelerations with an at least approximately equal number of intervals of acceleration and deceleration. During these intervals, the operator can vary the speed, for example, by approximately 1 mile per hour. The planning tool is rolled a suitable distance such as, for example, 150 feet. At 393, the topography is determined. Initially, k is equal to zero so no compensation is applied. At 394, the topography is evaluated in comparison to level. It is noted that the induced accelerations and decelerations can generally produce an oscillating topography. If the topography deviates from level by more than a threshold value such as, for example, of less than one inch. In an embodiment, the threshold can be ¼ inch from level over the level surface across which the planning tool is moved. Operation then proceeds to 395 which increases k by a suitable amount such as, for example, 0.01, although many values may be found to be suitable. At 396, the topography according to equations (A) and (B) is determined based on the new value of k and the accelerometer/encoder outputs from step 392. The new topography output is then compared to level at 394.

If it is determined at 394 that the determined topography is sufficiently level, operation proceeds to 397 which saves the current value for k. At 398, normal operation is entered which applies compensation in accordance with equations (A) and (B) using the saved value of k.

It is noted that the actual path along which the planning tool is rolled along the surface of the ground by the operator can be different than the path that is generated as a computational characterization of the actual path based on sensor inputs. For example, the path that is generated based on readings from one accelerometer is characterized in two dimensions in a vertical plane. In this case, the path is generally an accurate representation of the actual path so long as the planning tool is advanced in the vertical plane. An underground plan that is developed based on such a path, is understood to be below ground (aside from end points, if any) and the path can project vertically downward onto the underground plan, although this is not always the case, as will be further discussed. Measurements or data obtained by other sensors, including the GPS and noise receiver 330 can likewise be indexed against the measured distance along the path and stored, at least temporarily, in memory 314 by processor 310. With regard to noise data measured across a bandwidth, the measurements can be used subsequently or in real time for purposes of frequency selection as described, for example, in the above incorporated '901 and '140 patents as well as the above incorporated '299 application. Selected frequencies or sets of selected frequencies can be indexed against the measured distance along the path and/or against GPS position such that the selected frequencies can vary based on the locally measured noise.

Turning to FIG. 7, a diagrammatic view, in elevation, of a system which includes planning tool 10, is generally indicated by the reference number 400. The system further includes a drill rig 402 for moving a boring tool 404 through the ground and can include a portable locator, which will be shown in a subsequent figure. The boring tool includes a beveled face. Guidance of the boring tool through the ground can be accomplished using what may be referred to as a steering or push mode and a drilling or straight mode. In the steering mode, the roll orientation of beveled face of the boring tool is adjusted such that pushing on the drill string without rotation causes the boring tool to deflect and thereby steer in a desired direction. In the drilling mode, the drill string and thereby the boring tool are rotated while pushing such that the boring tool follows a straight (i.e., linear) path. The planning tool is an independent instrument that conveniently provides for the rapid on-site development of boring guidance to a target point from any point along the bore path, or generation of an underground plan for any portion of an overall drill run or for the entire drill run, irrespective of whether or not the drill rig is present. A footage counter 405 monitors the length of the drill string during subsequent drilling operations. One suitable embodiment of a footage counter or drill string length monitor is described in commonly owned U.S. Pat. No. 6,035,951 which is incorporated herein by reference. A telemetry signal 406 can provide for bidirectional communication with any desired system component such as, for example, a walkover locator that is used during a drilling operation, yet to be described. An operator 408 is shown moving planning tool 10 from a start or entry point 410 toward an end or exit point 412 of a path in the general direction of an arrow 414. Hence, this movement and associated data may be referred to as "outbound" (i.e., forward movement of the boring tool away from the drill rig) data. It should be appreciated that this initial set of data can just as easily be collected in the "inbound" direction (i.e., opposite arrow 414) at the discretion of the operator. The topography of ground 36 is rough which, in the prior art, introduces difficult challenges. In one embodiment, the planning tool can be configured to measure vertical topography (in the plane of the figure) resulting in a two dimensional contour or path on the surface of the ground, while in another embodiment, the planning tool can also measure transverse curvature of the path (normal to the plane of the figure) to define a three dimensional contour or path. It is noted that the transverse curvature of an intended path will subsequently be shown in an overhead view. A three dimensional bore path can be developed based on this three dimensional contour. The sensor suite that makes up sensor package 340 (FIG. 6a) can be customized based on the number of dimensions defining the surface contour.

Operator 408 proceeds by rolling planning tool 10 outbound from the drill rig along the surface of the ground to exit position 412 which can be down set from the surface of the ground in a pit 416. Potential obstacles can be present along or below the actual path such as, for example, a utility line 420. The operator can stop rolling the planning tool and pause data collection at any time, for example, by actuating trigger 96 (FIGS. 1 and 2) or by using a pause button 422 (FIG. 6) on app 384 and then restart data collection. This allows the operator to pause, for example, to reassess the direction in which to roll the tool or to move the tool, for instance, to the opposite side of a building, body of water or other geographic obstacle and then restart rolling and data collection. During the pause, rotation of the primary wheel does not contribute to the measured topography. If there is an elevational difference from the point at which measurement is paused to where measurement is restarted, readings from atmospheric pressure sensor 320 can be used to characterize the difference in elevation, as will be further described at an appropriate point hereinafter. For a relatively short path and with oven 214 (FIG. 6a) in use, the first or outbound set of data collected during the initial movement of the planning tool from the entry point to the exit point, can be developed into a bore plan with no requirement for further data collection by the planning tool. Of course, such a unidirectional data set can be collected by proceeding from the exit point to the entry point. Applicant has discovered that stabilization of the accelerometer temperature by housing the accelerometer in a temperature controlled oven provides a significant improvement in accuracy for developing a short (e.g., less than 150 feet) bore plan or bore segment based on a unidirectional (i.e., either outbound or inbound) dataset. A unidirectional dataset is also appropriate for determining setbacks, yet to be described.

During the outbound movement, the operator can designate waypoints, which are shown as (a) through (n) in FIG. 7. It is noted that the operator has yet to reach waypoint (n), but waypoint (n) has nevertheless been shown for purposes of clarity. The operator can mark any number of waypoints along the path as indicated diagrammatically using an ellipsis in association with waypoints (h) and (n). Each waypoint can be indexed against measured distance from entry point 410, as well as GPS positions. The underground plan can then be developed based, at least in part, on the waypoints in conjunction with the surface contour, for example, using extrapolation, smoothing and/or curve fitting, as well as a heretofore unseen technique which maximizes linear drilling, as described below. In another embodiment, waypoints are not required. In this case, the underground path can be based exclusively on sensor readings versus distance along the path on which the planning tool is rolled, developing an essentially continuous path on the surface of the ground to define points that are separated, for example, by a fraction of an inch. In either case, an underground plan can also be developed based on the path, as characterized by the inbound data set. Another aspect of developing an underground path can involve a utility corridor. For example, such a utility corridor can mandate that the depth of the installed utility must be between 4 feet and 6 feet from the surface of the ground. In some instances, it may not be possible to meet these requirements based on the topography and drill string bending limitations, in which case a warning can be issued to the operator.

With regard to the use of a unidirectional data set, as contrasted with a bidirectional data set yet to be discussed, a calibration procedure can be performed at the time of manufacture under an assumption that the user walks at a speed that is within a speed window having minimum and maximum values to determine calibration coefficients that are then stored by the planning tool. This calibration procedure can be performed based on bidirectional movement data, for reasons which will become evident, or performed using automated test equipment. One suitable example of a speed window is from 1.5 miles per hour to 2.5 miles per hour, assuming 2 miles per hour as the walking speed of a typical user. In this way, user calibration is not needed. In some cases, however, user calibration may be needed, particularly when the surface texture is very coarse such as, for example, 6 inch crushed rock and the user cannot walk within the calibration speed window. Such a calibration is in addition to simply advising the operator to slow down based on detecting that the terrain is rough, as will be described at an appropriate point hereinafter. In this calibration, the planning tool is rolled across similar terrain for a limited distance such as, for example, 100 feet bidirectionally with the calibration coefficients determined based on the resulting data.

While the outbound path and data set produced in FIG. 7 can be sufficient to form the basis for an accurate bore plan, Applicants recognize that there can be a significant benefit, particularly for longer bore plans or bore segments, in reversing the direction of travel of the planning tool to collect a second data set. That is, the actual path is retraced to return to the entry point as is depicted in FIG. 8, which is described immediately hereinafter.

Referring to FIG. 8, in an embodiment, upon reaching end point 412, the operator can pause data collection using app 384 or using trigger 96, as described above, and then reverse directions, as shown, and move planning tool 10 toward drill rig 402 in a general direction 418 to produce a second or inbound set of data. The inbound data set is complete once planning tool 10 returns to entry point 410. In this embodiment, the path is developed based on both the outbound and inbound sets of data. Developing a plan based on collection of both outbound and inbound sets of data eliminates the need for calibration of the wheel, because biases or errors which may accumulate when walking the outbound path are canceled out when walking the return path. The operator can continue to designate waypoints on the path walking toward the drill rig, although this is not required. Inbound waypoints are designated with an appended prime (') mark. It is noted that the operator has yet to reach waypoints (d') and (c'), but these waypoints have nevertheless been shown for purposes of clarity. No correspondence of inbound and outbound waypoints is required such that the number of inbound waypoints can be more or less than the number of outbound waypoints. A complete and ordered collection of waypoints from the outbound and inbound sets of data is shown as (a), (b), (c), (c'), (d), (d'), (e), (e'), (h) and (n) in the present figure, for purposes of defining the path. The outbound and inbound waypoints can be combined and ordered during development of the path, for example, based on the measured and recorded distance along the surface of the ground. Another use for waypoints on either the outbound or inbound actual path is to mark the location of critical points such as, for example, waypoint (e) which is an above ground point corresponding to a utility 420. The operator can identify waypoint (e) as a critical waypoint. These critical waypoints can be referred to as flagged. In an embodiment, a flagged waypoint can include a position of the waypoint along the path, an offset distance and a direction of the offset. A depth point often references a vertical depth below an associated waypoint at which the boring tool should pass, with the depth being specified by the operator. In some cases, utility 420 or other obstacles may be exposed (indicated by dashed lines) in a procedure that is generally referred to as "pot-holing" such that an actual depth of the utility can be measured. This measured depth can be associated with waypoint (e) and identified as a down offset which serves as a prohibited depth at which the boring tool cannot be allowed to pass under waypoint (e) during the underground plan development. In the context of setback determinations yet to be described, it should be appreciated that a depth point can be specified as a negative value (i.e., above the surface of the ground).

Still referring to FIG. 8, in an embodiment in which GPS 324 is included, app 384 can display the outbound path along with the waypoints that the user has designated. In an embodiment which includes, for example, a sensor suite having a triaxial rate gyro and a triaxial accelerometer, or an IMU, app 384 can display lateral deviation of the inbound path from the outbound path, for example, using left/right arrows 424 in app 384 (FIG. 6a) in order to guide the user such that the inbound path maps closely to the outbound path. As the user approaches the entry point of the outbound path, the entry point can be displayed such that the user does not walk the planning tool beyond the entry point.

FIG. 9a is a flow diagram illustrating an embodiment of a method for developing an underground plan based on unidirectional data collection, generally indicated by the reference number 600. The method begins at 604 and proceeds to 606 to establish that temperature stabilization is active or made active. In other words, oven 214 is on for the data collection. At 608, a unidirectional data set (either outbound or inbound) is collected and stored, along with any designated waypoints, for example, as shown in FIG. 7. At 609, a current rate of movement or speed of planning tool 10 is compared to a maximum speed limit or threshold. If the limit is exceeded, the screen shot of FIG. 9b illustrates custom app 384 on tablet or smartphone 94 step 610 displaying a warning 611 for the operator to slow down. The limit corresponds to a velocity of the planning tool at which the wheels maintain contact with the surface of the ground even though the terrain may be uneven. Exceeding the limit can result in the primary wheel losing contact with the surface of the ground such that the primary wheel rotates freely. Of course, in this situation, the output of encoder 240 is not an accurate representation of the speed of the primary wheel on the path across the surface of the ground. In one embodiment, the limit is a constant. In another embodiment, the limit is changed dynamically responsive to an accelerometer output. For example, when the accelerometer output is noisy which is indicative of the surface being rough, the limit can be lowered as compared to the value that is used for a smooth surface. For a surface that is exceptionally rough such as, for example, 6 inch crushed rock, the calibration described above can be performed. In an embodiment, the terrain roughness is measured, for example, based on the output of camera 95 such that this measurement can contribute to dynamically establishing the speed limit. In yet another embodiment, the planner accepts an input from the user designating the type of terrain/surface, and a speed limit is assigned based on this input. In one feature, the current rate of movement can also be compared to a threshold minimum speed such as, for example, 3 inches per second, since movement that is too slow can cause problems including timer overflows. In this instance, the operator can be warned to speed up. In an embodiment, sensor data that is collected below the minimum speed can be ignored until the speed increases to a value above the minimum.

After step 609, operation proceeds to 612 when warning 610 is not necessary. Otherwise, step 612 is entered after warning 610 is issued. At 612, a pause can be entered responsive to the operator, for example, to allow the operator to move the planning tool from a first path to a second path where some sort of obstacle separates the first path from the second path. Subsequent to the pause, operation returns to data collection 608. At 613, once data collection is complete, the path is characterized in either two or three dimensions based on the data set. During this step, data from the various sensors can be weighted based on reliability of the sensor data. For example, reliance on magnetometer data can be weighted based on dip or inclination angle of the magnetic field detected by the magnetometer. Dip angle is an angle of the Earth's magnetic field with respect to horizontal which is generally known and mapped worldwide. The detected angle can be compared to a known or expected value of dip angle for the region of Earth in which the drilling operation is being performed. Sufficient deviation of the detected angle from the expected dip angle indicates that a magnetic material may be nearby such as, for example, a sufficient amount ferrous metal. Rebar is a typical source of a magnetic anomaly. The magnetic anomaly from the magnetic material distorts the magnetic field of the Earth, thereby locally changing the dip angle and inducing heading errors in the magnetometer output. Weighting of the magnetometer output can be based on the amount of deviation of the detected magnetic field from the expected dip angle. If the detected angle deviates sufficiently from the expected dip angle, reliance on accelerometer readings can, at least temporarily, be preferred over reliance on magnetometer readings. If the deviation is extreme, the magnetometer readings can at least temporarily be avoided for purposes of developing the underground plan. Once the detected angle has returned to within some threshold value from the expected dip angle, reliance on the magnetometer readings can resume for developing the path. At 614, the underground plan is generated based on the path(s). Smoothing, curve fitting and/or extrapolation can be applied based on the data representing the path during this characterization. Developing the underground plan can take into account any waypoints, flags and other critical information that has been identified. For example, a first bore segment that is based on the first path, discussed above, can be stitched to a second bore segment that is based on the second path. In this regard, the endpoints of the first path and the second path that are nearest to the obstacle can be separated by an elevational difference and/or a lateral offset. Atmospheric pressure differential can be employed, for example, as part of stitching bore segments together, as will be further described at an appropriate point hereinafter.

FIG. 9c is a flow diagram illustrating an embodiment of a method for developing an underground plan based on bidirectional data collection, generally indicated by the reference number 630. The method starts at 634 and proceeds to 638 at which a first or outbound data set is collected subject to any pauses that are introduced by the operator. It is noted that temperature stabilization of the accelerometer is not required, although such stabilization can be employed. At 640, a second or inbound data set is collected and stored, along with any designated waypoints, as shown in FIG. 8, subject to any pauses introduced by the operator. It is noted that any data collection including outbound and inbound collection of FIG. 9c can utilize the speed limit feature shown in FIG. 9a. In the present embodiment at 644, the outbound set of data is combined with the inbound set of data. This data combination provides the significant benefit of canceling sensor biases (i.e., fixed measurement biases) that are fixed directionally such as, for example, those exhibited by MEMS accelerometers such that calibration is not needed. Canceling can be achieved, for example, by using averaging to combine the inbound and outbound data sets.

At 648, the path is characterized in either two or three dimensions based on the combined data. During this step, weighting can be applied as discussed above with regard to FIG. 9a. At 650, the underground plan is generated based on the path, taking into account any waypoints, flags and other critical information that has been identified. Smoothing, curve fitting, extrapolation, and the technique brought to light below which maximizes linear drilling can be applied in view of the combined data representing the path to establish the underground plan in order to account for waypoints.

Referring to FIGS. 10 and 11, the former is a diagrammatic illustration, in elevation, of system 400 including a path 700 at surface 36 of the ground while FIG. 11 is a diagrammatic overhead or plan view. An underground plan, in this case a bore plan, 710 is illustrated as a dashed line. The bore plan of the present example can include three portions: an entry portion 714, a main portion 716 and an exit portion 718, although this particular bore plan shape or architecture is not a requirement and any suitable shape can be used. Other inputs to the procedure can include characteristics of the drill rig and drill string in use such as, for example, the minimum (i.e., tightest) bend radius of the drill string, and a rack angle range for drill rig 402. With regard to the latter, drill rig 402 includes a rack 720 that supports drill pipe 724. Of course, individual drill pipes are joined during drilling to extend a drill string that leads to the boring tool. Rack 720 is adjustable within a rack angle range 728, diagrammatically indicated by a double headed arcuate arrow, which changes the angle of boring tool 404 for purposes of entering the ground. The bore plan procedure can determine a setback 730 (shown as a point) of the drill rig from entry point 410 and a pitch for entry portion 714 that is determined by the rack angle. For example, the setback can be the horizontal distance of the tip of the boring tool on the drill rig from the entry point prior to the start of drilling. The setback is in a reverse direction that is opposite of drilling in the forward direction. The bore plan can then curve from the entry portion to the main portion at a radius that is no tighter than the minimum bend radius to main portion 716. The depth of main portion 716 can be determined based on a minimum depth requirement below a low point 734 on the contour of the path to meet a minimum cover requirement. In the present example, the depth of the main portion is determined, at least in part, based on utility 420 having a flagged measured depth. Accordingly, the main portion is configured to pass below utility 420 to maintain a required minimum distance below the utility, taking the measured depth into account. Passing above the utility, in this example, would cause the minimum cover requirement from surface 36 to be violated. It is noted that the depth of the bore plan is known for any given overhead position along the intended path. The main portion of the bore plan then curves at a radius that is no tighter than the minimum bend radius to exit portion 718 which emerges at exit point 412.

In an embodiment, step 614 of FIG. 9a or step 650 of FIG. 9b can determine the bore plan by projecting the path down to the correct depth along its length, accounting for the entry, main and exit portions as well as the topography of path 700, waypoints and flagged positions. Curve fitting, extrapolation and smoothing of any suitable type, as well as the technique brought to light below which maximizes linear drilling, can be applied to any portion of the projection of the path and/or waypoints, flagged positions and other critical information to form the bore plan.

In FIG. 11, path 700 is shown in an overhead view to illustrate its lateral or side-to-side curvature. Of course, a sensor package including, for example, an IMU and/or a magnetometer is required to measure side-to-side curvature. Bore plan 710 adopts a linear route, in a plan view, from entry point 410 to exit point 412, although this is not a requirement. This simplification of the bore plan is generally desirable to simplify the route that the boring tool follows and to shorten the utility line yet to be installed. With regard to a linear route, Applicants recognize that it is difficult for a drill rig operator to follow a continuous and lengthy curve since this can necessitate a plurality of time consuming switches between the steering mode and the drilling mode. As will be further discussed in detail below and in an embodiment, planning tool 10 can develop the underground plan in a way that maximizes straight or linear drilling for purposes of elevational and lateral movement. It should be understood that linear drilling requires only a constant pitch. In this regard, there is no requirement that linear drilling must be at zero pitch. According, the pitch can be horizontal, a decline or an incline for a given linear inground path. As is the case with bore plans 710 and 710', an underground plan configured in accordance with this recognition includes straight sections (e.g., 714, 716 and 718) that are joined or interconnected by distinct turns. In other words, a turn is configured to place the boring tool onto a new heading for drilling along a linear section of the underground plan. The turn can be configured such that the drill string can bend up to but not exceed its minimum (i.e., tightest) bend radius.

FIG. 12 is another diagrammatic illustration of a bore plan 710', in a plan or overhead view. In this example, a flagged waypoint (f) identifies a position along the intended path that is proximate to an obstacle 750 such as, for example, a utility pole. Flagged waypoint (f) further identifies an offset from the obstacle and a direction to the obstacle. The offset can be the actual distance from path 700 or a minimum required setback. Due to the location of obstacle 750, a linear path from entry point 210 to exit point 212 is unworkable and lateral or side-to-side curvature is required to avoid the obstacle. In this instance, bore plan 710' is developed including curvature (e.g., a single curve connecting two linear sections) to maintain at least a minimum separation from obstacle 750.

FIG. 13 is a diagrammatic view, in elevation, of system 400 during a drilling operation which includes a boring tool 404 moving along bore plan 710 responsive to the drill string. Operator 408 is using a portable walkover locator 910 for locating the boring tool based on an electromagnetic dipole signal 914 that is transmitted from the boring tool. The electromagnetic dipole signal can be modulated with sensor data including but not limited to the pitch and roll orientation of the boring tool. The operator can find an overhead point 916 that is directly over the boring tool and confirm that the depth is as expected. In this regard, the expected depth of the bore plan can be indexed based on the length of drill string 918, as measured by footage counter 405 at the drill rig, and the topography or surface contour measured by the planning tool. It is noted that the drill string is made up of a series of removably connectable drill rods each of which has a rod length. By way of non-limiting example, the rod length can be 10 feet. That is, the distance from entry point 410 to overhead point 916 along the surface path is not the same as the distance from entry point 410 to a projection of overhead point 916 onto underground plan 710, due at least to the contour of the topography. To resolve this problem, distance along the underground plan can be correlated with distance along path 700 such that, for any given position along path 700, an expected depth is known. Other data can be correlated in this manner. For example, noise data can be correlated if an embodiment of planning tool 10 measures noise across some bandwidth against distance along the path. Thus, for any given position along path 700, an expected amount of noise across the bandwidth is known. It is noted that the fluxlines of signal 914 are horizontal at the overhead point because the boring tool is horizontal (i.e., zero pitch). Overhead point 916 is contained in the only plane in which all of the fluxlines of signal 914 are parallel. This plane is normal to the view of the figure and may be referred to as a locate plane 920 which appears as a dotted line. Assuming that the surface of the ground is flat and level, this plane defines a line at the surface that is referred to as a locate line. If the boring tool is pitched, however, the locate plane is tilted such that the fluxlines will not be horizontal at the overhead point.

Still referring to FIG. 13 and as discussed above, frequency selections along the intended drill run can be made based on the noise measured by planning tool 10. During the planning process, the planning tool can index noise measurements and/or frequency selections based on the noise measurements versus distance along the path on which the planning tool is rolled. These frequency selections can also be translated to distance along a corresponding underground path that is determined by the planning tool. The frequency selection versus distance information, in any suitable form, can be available via any suitable component(s) of system 400 including, for example at drill rig 402 and/or locator 910. In this way, the selected frequencies transmitted by boring tool 404 can be changed in any suitable manner as the boring tool progresses through the ground. In one embodiment, frequency change instructions are issued based on the output of footage counter 405. In another embodiment, frequency change instructions are issued based on GPS position. Changing or toggling between frequencies and/or sets of frequencies can be accomplished in any suitable manner either manually or automatically such as, for example, by performing a roll orientation sequence, sending instructions down drill string 918 from the drill rig and also transmitting the instructions to the locator via telemetry, wirelessly transmitting the instructions directly from locator 910 to the boring tool or transmitting the instructions via telemetry from the locator to the drill rig which then relays the instructions to the boring tool. In any case, frequency changes can be coordinated between locator 910 and boring tool 404 such that both devices remain synchronized or coordinated from a frequency selection perspective, as drilling proceeds.

Attention is now directed to FIG. 14 for purposes of describing additional features of the highly versatile planning tool of the present disclosure with respect to drill rig setback. FIG. 14 illustrates planning tool 10 positioned at a predetermined position which corresponds to entry position 410 for boring tool 404. Boring tool 404 and footage counter 405 are shown in phantom using dashed lines since these items are not yet required to be present during the planning that is taking place. Initially, the primary wheel of the planning tool is placed directly on entry position 410, since encoder 240 (FIG. 5) measures rotation of the primary wheel. The planning tool is then rolled in reverse direction 930 along path 934 on the surface of the ground to measure the contour of the path in the plane of the figure. Planning tool 10 is rolled a distance along the path that is significantly longer than the length of the drill rig plus the potential setback such as, for example, at least 1.5 times the length of the drill rig. In this way, the contour of the surface of the ground on which the drill rig will sit is characterized. Based at least in part on the contour, planning tool 10 determines a setback position 940 from entry point 410 directly above which the tip of boring tool 404 should be positioned and a rack angle $\theta_1$. In this regard, a depth point having a negative value can be associated with setback position 940 essentially treating the setback position as a waypoint. The latter can be a value that is set by the operator in advance or the planning tool can determine rack angle $\theta_1$ within rack angle range 728, although this is not required. A dashed line 944 indicates the path of the boring tool passing through entry position 410. It is noted that the setback can be determined with respect to any suitable feature of the drill rig other than the tip of the boring tool. For example, the setback can be specified to a point on footage counter 405. A setback determination that accounts for surface topography can be based on the minimum horizontal distance necessary to get from one elevation and orientation (i.e., pitch) at a first point to a second elevation and orientation at a second point. A difference in elevation between the setback position and the entry point can be based on the measured topography. Accordingly, an underground path can be developed from the first point to the second point, for example, in a manner that is consistent with the descriptions below.

FIG. 15 illustrates planning tool 10 located at a predetermined position which corresponds to a waypoint, WP, that is directly above a target position 950 that is offset downward from WP by a depth D and through which the boring tool is intended to pass. A desired pitch at the target position can be specified including zero degrees which will necessitate a curved path, as will be further discussed. The primary wheel of the planning tool is placed on WP since encoder 240 (FIG. 5) measures rotation of the primary wheel. The planning tool is then rolled in reverse direction 930 (i.e., opposite of the drilling direction) along path 934 on the surface of the ground to measure the contour of the path in the plane of the figure. Again, planning tool 10 is rolled a distance along the path that is at least as long as the length of the drill rig and sufficient to account for a relatively longer setback, in light of the geometry involved, such that the contour of the surface of the ground on which the drill rig will sit is characterized. Based at least in part on the contour, planning tool 10 determines a setback position 954 from WP directly above which the tip of boring tool 404 should be positioned (i.e., a depth point having a negative value), an entry position 956 and a rack angle $\theta_2$. The latter can be a value that is set by the operator in advance or the planning tool can determine rack angle $\theta_2$ within rack angle range 728. A dashed line 958 indicates the path of the boring tool passing through entry position WP. It is noted that the setback can be determined based on any suitable feature of the drill rig other than the tip of the boring tool. For example, a point on footage counter 405 can be used.

Still referring to FIG. 15, in an embodiment, the user defines the pitch at the start point (which, for purposes of simplicity, is assumed for this example to be the entry point but which can be any point along the bore path), the pitch at an end/target point (for example, zero degrees), and the bend radius of the drill pipe (or whatever bend radius is desired). The difference in elevation between the start point and target point can be determined based at least in part on the measured topography. The system can determine a circular path, with the smallest radius equal to or greater than the minimum bend radius, that is tangential to the pitch at each specified point and which provides the desired change in elevation. If the bend radius of the determined path is less than the minimum bend radius, an error is returned, and, if not, the output is the horizontal distance between WP and setback position 954 and/or WP and entry position 956. An underground path passing through target position 950 and satisfying specified orientation parameters can be developed, for example, in a manner that is consistent with the descriptions below.

In one feature, custom app 384 can indicate to the user that he or she has walked far enough to generate a valid path. In other words, the drill rig can be set up at any point at or beyond the point where the app indicates that the path is valid.

FIGS. 16 and 17 are diagrammatic illustrations of a drilling region 1000 including planning tool 10 being moved by operator 408 involving an obstacle such as, for example, a body of water 1004. For purposes of FIGS. 16 and 17, it is noted that the drilling (i.e., forward) direction is from left to right. FIG. 16 illustrates operator 408 having moved planning tool 10 along a first path 1010 in forward direction 1014 from a first point 1018 on the first path to a second point 1020 on the first path at the edge of water 1004 to characterize the surface contour of the first path. It is noted that first point 1018 can be an entry point, although this is not required. As discussed above, measured accelerometer values can be indexed against the encoder output along with GPS position and atmospheric pressure readings, which correspond to elevation as well as noise measurements. Having reached second point 1020, the operator can designate this point as waypoint associated with a depth point 1030 that is offset vertically downward by a distance $D_1$. It is noted that $D_1$ can be based on advance knowledge of the depth of the body of water. If path 1010 meets the requirements for defining an underground plan based on a unidirectional dataset as described above, data collection for path 1010 can conclude. On the other hand, if bidirectional data is desired, operator 408 can reverse directions and roll planning tool 10 back to first point 1018 on the first path. It is noted that a very short end portion of first path 1010, adjacent to second point 1020, is only characterized by unidirectional data due to water 1004. That is, the operator can initially proceed in the reverse direction by standing at the edge of the water with the planning tool positioned ahead of him/her in the reverse direction. However, this is not significant since the overall length of the path will generally be much longer than the end portion and accelerometer drift over such a short distance is likewise insignificant.

FIG. 17 illustrates operator 408 and planning tool 10 on an opposite shore of water 1004 after having rolled the planning tool along a second path 1040 from a first point 1044 to a second point 1048. Having reached second point 1048, the operator can designate this point as a waypoint associated with a depth point 1050 that is offset vertically downward by a distance $D_2$. It is noted that second point 1048 is on top of an embankment 1052 somewhat above water 1004. The operator can set $D_2$ to be equal to $D_1$ or make an estimation of the height of the planning tool above the water and adjust $D_2$ accordingly. Again, measured accelerometer values can be indexed against the encoder output along with GPS position and atmospheric pressure readings. If path 1040 meets the requirements for defining an underground plan based on a unidirectional dataset, as described above, data collection for second path 1040 can conclude. On the other hand, if bidirectional data is desired, operator 408 can reverse directions and roll planning tool 10 back to first point 1044 on the second path. As above, a very short end portion of second path 1040, adjacent to second point 1048 on the second path, is only characterized by unidirectional data due to water 1004.

With data characterizing both first path 1010 and second path 1040 stored, in one embodiment, processor 310 (FIG. 6a) can determine an underground plan. In another embodiment, the data can be transferred and an external processor can determine the underground plan. For instance, the external processor can be located at the drill rig or at a remote processing center. For purposes of the present disclosure, it will be assumed that local processor 310 determines the underground plan. It is noted that the underground plan is made up of a 1 from point 1018 to depth point 1030, a second or intermediate bore segment 2 from depth point 1030 to depth point 1050 and a bore segment 3 from depth point 1050 to exit position 1044. Of course, no surface contour was measured in associated with bore segment 2. While the surface of the water is noted as flat, this has no bearing on the shape and/or depth of water 1004. It is noted that bore segment 2 may be referred to as a stitching bore segment that links segment 1 to segment 2. For a stitching bore segment, the contour of the surface of the ground is generally unknown. What is known are the endpoints in GPS coordinates of bore segments 1 and 3, and a difference in elevation between waypoint 1020 on the first path and waypoint 1048 on the second path based, for example, on atmospheric pressure readings and/or GPS. The length of bore stitching segment 2 is the lateral offset across the body of water which can be determined, for example, based on GPS readings. In terms of depth for the underground plan, the processor can determine which of D1 and D2 is actually the deepest and utilize that value to determine the underground plan. For example, if the operator enters D2 as at least approximately equal to D1, the processor adopts D1 at point 1030 as the depth. As discussed above with regard to FIG. 10 and assuming that point 1018 is an entry point, the underground plan can include an entry portion 1054, a main portion 1058 and an exit portion 1060. Other inputs to the procedure can include characteristics of the drill rig and drill string in use such as, for example, the minimum (i.e., tightest) bend radius of the drill string and a rack angle range for the drill rig to be used. As will be seen, the underground plan can be made up of linear sections that are connected or joined by curves/turns. In an embodiment, each curve can have a fixed or constant bend radius. A setback for the drill rig can be determined in a manner that is consistent with the descriptions above. It should be appreciated that crossing under an obstacle such as a river can be accomplished by setting waypoints with associated depths on either side of the obstacle as an intermediate bore segment with no need to define an overall bore plan. As will be seen, obstacles can be handled based on predefined gaps.

FIGS. 18 and 19 are diagrammatic illustrations of a drilling region 1100 including planning tool 10 being moved by operator 408 involving an obstacle such as, for example, a cliff 1104. The drilling (i.e., forward) direction is from left to right. In this example, an intermediate portion of the underground plan is being determined. That is, the intermediate portion is positioned between but does not include either a start position at which the boring tool enters the ground (i.e., an entry position) or an exit position at which the boring tool leaves the ground. FIG. 18 illustrates operator 408 having moved planning tool 10 along a first path 1110 in forward direction 1014 from a first point 1118 on the first path to a second point 1120 on the first path at the base of cliff 1104 to characterize the surface contour of the first path. It is noted that first point 1118 was designated by the operator as a waypoint associated with a depth point 1130 that is vertically downset from first point 1118 by a depth $D_3$. Thus, depth point 1130 is an intermediate position on the overall drilling plan. This scenario can arise, for example, when the boring tool is already located at depth point 1130 and is then exposed in a pothole or located using a portable walkover locator. Accordingly, the operator's intent is to define an underground plan that continues from depth point 1130. At second point 1120, the operator has designated a waypoint that is associated with a depth point 1134 at a depth $D_4$. First path 1110 can be characterized by unidirectional or bidirectional data as determined to be suitable.

Turning to FIG. 19, operator 408 moves to the top of cliff 1104 and rolls the planning tool along a second path 1140 from a first point 1144 to a second point 1148. At first point 1144, the operator has designated a waypoint including a depth point 1150 at a depth of $D_5$. Having reached second point 1148, the operator can designate this point as a waypoint associated with a depth point 1154 that is offset vertically downward by a distance $D_6$. The operator can set $D_3$, $D_4$ and $D_5$ as equal although this is not a requirement. The operator can set $D_6$ based on an estimate of the height of cliff 1104 and add that value to $D_4$. Note that elevation based on GPS and/or atmospheric pressure can be displayed by app 384 (FIG. 9b). Second path 1140 can be characterized by unidirectional or bidirectional data as determined to be suitable. In an embodiment, it is only necessary for the operator to specify depth point 1130 and depth point 1150 in order for the planning tool to develop an underground plan 1160 in conjunction with the first and second surface contours.

Underground plan 1160 which, in this instance, is a bore segment can be developed based on measured accelerometer values indexed against the encoder output along with GPS position and atmospheric pressure readings for first path 1110 and second path 1140. Distance along bore segment 1160 can be characterized based on adding the total length of the drill string up to depth point 1130 or simply measured as distance from depth point 1130. Once the boring tool reaches depth point 1150, subsequent guidance is at the discretion of the drill rig operator. In the present example, depth points 1134 and 1154 are separated by a bore stitching segment for which the exact surface contour is unknown, although it is evident by comparison of data characterizing waypoint 1120 and waypoint 1148 that a cliff type obstacle is present.

With FIGS. 18 and 19 in hand, it will be evident that an underground plan for a cliff obstacle can readily be developed when the cliff is a down-step as opposed to the up-step shown in these figures. In an embodiment, the bore stitching segment can correspond to a predefined gap for a known obstacle including, but not limited to railroad tracks, a highway, a river and other barriers across which the planning tool cannot roll, but a waypoint with a depth offset can be set to either side of the obstacle. In an embodiment, a predefined gap can be entered into planning tool 10 by the operator first initiating a pause using app 384 and then selecting a quick add function menu which specifies the addition of the predefined gap. The system/app can prompt the user to fill in information that is needed to define the selected predefined gap. In some cases, the operator may not know the specific parameters that are necessary for the system to fill in the predefined gap. In this case, the user can be prompted to enter this information later, for example, by adding a suitable symbol and/or an image taken by camera 95 to be displayed to the user on a partially mapped path. It is noted that operator 408 can easily add an exit path to bore segment 1160 by simply designating a waypoint at the surface of the ground at a position that is spaced away from waypoint 1050 to the right in the view of the figure and a target depth, for example, to emerge in a pit.

FIG. 20 is a diagrammatic view, in elevation, of a system 1200 (also see FIG. 7 for a similar system) for moving boring tool 404 through the ground which system includes planning tool 10. In this figure, the underground drilling operation is already underway and the boring tool has arrived at a point 1204 at a depth $D_S$. For purposes of the present example, it is assumed that the presence of a previously unknown and unexpected utility 1210 has just been discovered. Prior to arrival at point 1204, the drilling crew may have been following a now obsolete bore plan that did not account for utility 1210 or may have simply been drilling in the general direction of a desired endpoint for the drill run when utility 1210 was discovered. The flexibility of planning tool 10 provides for the generation of essentially immediate guidance when a situation such as depicted is encountered. It is assumed that the depth of the boring tool, $D_S$, is either already known or measureable, for example, using locator 910 (FIG. 13) or by exposing the boring tool in a pothole. Pitch orientation of the boring tool can be read by the locator (FIG. 13). In order to provide guidance, planning tool 10 is used to characterize an intermediate segment starting from an initial surface position 1220 that can be directly above the boring tool at the illustrated current inground position. Operator 408 can designate point 1220 as a waypoint characterized by a depth offset of $D_S$ and roll planning tool 20 from waypoint 1220 to a subsequent point 1230, also designated as a waypoint, that is directly above utility 1210 in a direction 1232, indicated by an arrow, and can set waypoint 1230 to have a depth offset 1234, that is of sufficient depth to avoid utility 1210. If desired, the operator can also set a target pitch for arrival at depth point 1234. It is assumed that the boring tool must pass below utility 1210 in order to maintain sufficient cover above the boring tool for a utility yet to be installed while maintaining at least a minimum clearance from utility 1210. In addition to setting waypoint 1230 or as an alternative, waypoint 1230 can be designated by a flagged waypoint with a depth offset that is equal to the actual depth of utility 1210 such that this depth is forbidden on the underground plan. For reference, a flagged waypoint is described with regard to FIG. 8. The operator can also reverse the direction of planning tool 10 and roll the planning tool from subsequent position 1230 back to initial position 1220 to develop a bidirectional dataset between these points. The need for a bidirectional dataset can be determined by factors described in detail above.

Based on either a unidirectional or bidirectional dataset characterizing the topography and distance between initial point 1220 and subsequent point 1230 in conjunction with associated waypoint information, planning tool 10 develops guidance for an intermediate segment 1240, which is shown as a dashed line. Assuming that the operator is not concerned about the arrival pitch at depth point 1234, the planning tool can provide an average pitch needed to reach depth point 1234. This can involve an initial turn 1244, in the present example, which does not violate the minimum bend radius of the drill string to place the boring tool on a straight heading 1248 leading to waypoint 1234. In the instance of the operator specifying a target pitch at waypoint 1234, it is likely that a more complex path will be needed that can include two or more turns, for example, to pitch the boring tool up at the waypoint, for example, using linear sections joined by curves/turns. In an embodiment, planning tool 10 can provide guidance at incremental positions 1250, several of which are individually designated, between initial position 1220 and subsequent position 1230. The incremental positions can be evenly or equally spaced apart by a suitable distance such as, for example, 10 feet. A target depth and a target pitch can be determined for each incremental position which is useful for purposes of characterizing an intermediate segment that includes multiple turns. In another embodiment, incremental positions 1250 can be configured to correspond to the endpoints of the drill rods that are ultimately used during drilling to form the borehole. It should be appreciated that when the drill rods are of the same drill rod length, the endpoints of the drill rods remain spaced apart in the ground by one drill rod length as the drill rods are individually pushed into the ground, thereby extending the length of the drill string rod-by-rod with the drill rod endpoints maintaining consistent positions on a rod-by-rod basis. By way of example, rod numbers n to n+2 are shown in association with incremental positions 1250, immediately to the right of initial point 1220 in the figure. The drill rod endpoints can be projected vertically, as depicted by dot/dash lines, and mapped to the surface of the ground based on correlation of distance along the inground path with the measured topography at the surface of the ground. Stated in another way, the endpoints of the drill rods are projected vertically upward to the path at the surface of the ground that has been mapped by the planning tool. In this instance, the distance between surface points 1250, can change responsive to the pitch of the boring tool as well as the surface topography. Accordingly, as drilling proceeds, guidance is available to the operator on a rod-by-rod basis at the surface points at least providing a target depth and a target pitch at each surface point. By way of example, a locator can be used to check the depth and other parameters of the boring tool at each surface point rod-by-rod as drilling proceeds for comparison with the planned inground depth in order to determine whether the boring tool is on plan. During drilling, target depths and target pitches for the incremental positions can be displayed either on a locator or at the drill rig in any suitable manner.

Still referring to FIG. 20, it should be appreciated that the intermediate segment being created is not limited to ending at depth point 1234, but can be extended past utility 1210 by any desired length to any desired position. For example, the operator can continue rolling the planning tool to an additional surface position 1254 and designate this point as an additional waypoint having a depth offset 1258 at any desired depth 1260 and suitable target arrival pitch, although the latter is not required. In this case, an intermediate segment 1262, shown as a dotted line, can be generated based on the surface topography, distances and designated waypoints. Because intermediate segment 1262 passes through depth point 1234, it is noted that pitch along the intermediate segment for purposes of passing through depth point 1234 will be determined by the planning tool and there is no need for the operator to specify a target pitch at this waypoint. The intermediate segment can be configured as curves that are joined by linear sections, as illustrated. It is also noted that depth point 1258 can be specified such that the boring tool emerges from the ground or in a pit. Likewise, depth point 1258 can be specified such that the drilling crew then continues to drill from this depth point in a general direction to complete the drill run without the need for a bore plan. Based on these features, the flexibility of planning tool 10 is submitted to be unmatched by allowing a drilling crew to rely on the planning tool on an as-needed basis in order to overcome the more technical portions of an overall drill run.

In view of FIGS. 14-20 and although not required, an embodiment of planning tool 10 can be dedicated to producing guidance that is essentially as-needed rather than an end-to-end bore plan. For instance, a limit can be imposed, in this embodiment, on the length of the above ground path along which the planning tool can be rolled for purposes of generating a corresponding underground path. In this way, guidance can generally be provided for no more than a bore segment of limited length such as, for example, 75 feet.

FIG. 21*a* is a flow diagram illustrating an embodiment of a method for generating an inground plan or path based on data collected by planning tool 10 and generally indicated by the reference number 1400. As noted above, this method can be performed by processor 310 (FIG. 4), although this is not a requirement. As a general overview, the method involves extending the underground plan based on two points at a time, while maximizing the amount of linear drilling for purposes which have been described above. The first point is considered to be the current location of the boring tool from which the underground plan is to be extended while the second point is referred to as a target endpoint. Target endpoints can be points along the underground path determined by the planning tool and/or waypoints in any suitable combination. The specific manner in which the method is performed depends upon whether or not a target pitch and/or a target yaw are specified for a given target endpoint. Such specifications can be made by the operator of the planning tool, for example, in association with waypoints and/or automatically, for example, based on the output of a yaw sensor. For the current location, it is assumed that the coordinates (x,y,z), pitch and yaw are known. For the target endpoint, it is assumed that at least the coordinates (x,y,z) are known. The task can be performed by any suitable processor or component either at the drill site or remotely. One example of a suitable processor is the processor in the planning tool while another example is a processor located at the drill rig. The method begins at start 1404 and proceeds to 1406 which obtains a desired bend radius for the equipment in use as well as a minimum (i.e., tightest) bend radius for the drill rods that will be used during drilling. Both of these values can be obtained, for example, through querying the operator of the planning tool. Generally, the desired bend radius can be greater than the minimum bend radius such as, for example, double the minimum bend radius. At 1408, the method collects the available data for the current position and the target endpoint and identifies a current scenario based on the data. There are four possible scenarios to be described, as set forth in Table 1:

TABLE 1

| Scenario | Target Pitch | Target Yaw | Coordinates |
|---|---|---|---|
| 1 | | | X |
| 2 | X | | X |
| 3 | | X | X |
| 4 | X | X | X |

Known Values Indicated by an "X"

At 1414, the method tests whether the current scenario is scenario 1 in which both the target pitch and the target yaw are unspecified. If so, operation proceeds to 1418. In this instance, the operator is essentially unconcerned about the arrival pitch and yaw orientations at the target endpoint. Accordingly, an efficient path can be designed that is made up of an initial curve followed by a linear section leading directly to the target endpoint, as described immediately hereinafter. Referring to FIG. 21*b*, scenario 1 path generation is diagrammatically indicated by the reference number 1430. A dotted circle 1432 indicates a desired bend radius R. A current direction 1434 of the boring tool is indicated as a vector at a current location 1436 situated on the desired bend radius R which is normal to current direction 1434. A target endpoint 1438 is illustrated such that a plane is defined by current direction 1434 and target endpoint 1438 which is the plane of FIG. 21*b*. An initial circular section 1440 of the path extends, at desired bend radius R, from current location 1436 to a point P at which the heading of the boring tool leads straight to target endpoint 1438 in the plane of the figure. Accordingly, a linear section 1442 is then configured to extend from point P directly to target endpoint 1438.

Having determined what can be referred to as a linear arrival path at 1418 in FIG. 21*a*, the method then moves to 1450 which tests whether the path is practical, for example, based on the specified desired bend radius. If the target endpoint is sufficiently close, by way of example, it may not be possible to form the path at the desired bend radius. If the path is not practical, operation moves to 1452 which reduces the bend radius and sends operation back to 1408 such that the method repeats based on a new, tighter bend radius. In this way the bend radius can be incrementally reduced by a suitable amount until an acceptable path is produced. If no path is practical, even at the minimum bend radius, an error can be returned. Once a practical path has been determined based on the decision at 1450, step 1454 then determines whether the path continues with another target endpoint. If so, operation returns to 1408 with the position of the just-determined target endpoint then serving as a new or updated current position for extension of the underground path.

Still referring to FIG. 21*a*, and returning to the description of step 1414, if this decision identifies that at least one of target pitch and target yaw is specified for the target endpoint, operation moves to 1456 which tests whether both target pitch and yaw are specified for the target endpoint. If so, operation proceeds to 1458 which invokes an iterative technique for path generation, as will be described immediately hereinafter.

Attention is now directed to FIG. 21*c* which diagrammatically illustrates an iterative path determination technique, generally indicated by the reference number 1460. The technique can use incremental movements at the desired bend radius from a current position 1462 toward a target endpoint 1464 and from target endpoint 1464 toward current position 1462 defining a start section 1466 and an end section (not yet illustrated) of the plane. Once the confronting ends of the start section and the end section define headings that are pointing directly at one another within a suitable threshold value such as, for example, within less than 1 degree, a linear section is formed between the start section and the end section. Initially, certain angular values are defined with respect to a line 1468 that connects the current position and the target endpoint. A first angle $\theta_1$ is formed in a first plane that is defined by line 1468 and a start direction or forward heading 1470 which is a vector at the current position representing the current heading of the boring tool. A second angle $\theta_2$ is formed in a second plane that is defined by line 1468 and an inverse end direction or reverse heading 1472 which is the opposite of an end heading 1472' that is defined by the specified target endpoint heading, including target pitch and target yaw. Initially, angles $\theta_1$ and $\theta_2$ are compared in magnitude. The incremental movements alternate between the two ends based on which of these two angles exhibits the largest magnitude. In the present example, $\theta_1$ is larger such that the first increment, having the desired bend radius, extends along start section 1466. The amount of turning is sufficient to change the heading from the start direction by an amount that can be equal, for example, to the threshold value. $\theta_1$ and $\theta_2$ are then compared. If $\theta_2$ is then greater than $\theta_1$, a similar movement is made in the second plane from the target endpoint toward the current position. Based on comparing these two angles, the iteration alternates between the start section and the end section.

Turning now to FIG. 21*d*, this incremental process continues until the forward heading of start section 1466 at a point 1474 and the reverse heading of an end section 1476 at a point 1478 extend directly toward one another at least within the threshold. To complete the path, a linear section 1480 is then defined between points 1474 and 1478.

Turning back to FIG. 21*a*, after completion of the iterative path generation, operation continues at 1450, testing whether the determined path is practical in the manner described above. If not, the bend radius is reduced at 1452 and the process repeats. If 1450 confirms that the path is practical, operation routes to 1454 to determine whether another target endpoint is available. If so, operation routes back to step 1408.

Returning now to the discussion of step 1456, if it is determined that only one of target pitch and target yaw are specified, operation proceeds to 1484 which determines the unspecified target pitch or target yaw based on a geometric relationship. With this determined value in hand, the method then continues at 1458, in the manner described above.

Once it is determined at 1424 that no more target endpoints are available (i.e., the entire underground plan is complete), operation proceeds to 1486 which can interpolate the overall path and then output the result. It should be appreciated, for example, that the iteratively determined positions making up start sections 1466 and end sections 1466, of which there can be many in the overall underground plan, can be relatively closely spaced apart whereas linear sections 1480 can be very long and only defined by their ends. Step 1424 can determine, for example, equally spaced apart positions along the entire underground plan to formulate the complete underground plan and to utilize as a reference while drilling. In an embodiment, the spacing can be one drill rod length, although this is not required.

At 1488, the bend radii are checked along the entire underground plan to insure, for example, that the minimum bend radius is never violated. If the minimum bend radius is violated, an error can be presented to the operator. At 1490, the underground plan is checked for obstacle intersects such as, for example, with known utilities.

Referring to FIG. 21*e* in conjunction with FIGS. 21*c* and 21*d*, the former is a flow diagram illustrating an embodiment, by way of non-limiting example, of step 1458 of FIG. 21*a*. The method begins at 1504 and moves to 1508 which collects the current endpoint (i.e., in the direction of or nearest the end section) of start section 1466 and the current position (i.e., in the direction of or nearest the start section) of end section 1476 as well as the pitch and yaw orientation for each of the start section and the end section. At 1510, angles $\theta_1$ and $\theta_2$ are determined. At 1514, a forward heading 1518 (FIG. 21*d*) of the start section is compared to an reverse heading 1520 of the end section at the point nearest the start section. If the threshold is satisfied such that the forward heading and the inverse heading are essentially aligned, step 1524 creates linear section 1480 and, at 1528, operation returns to step 1450 of FIG. 21*a*. On the other hand, if alignment is not achieved at 1514, operation routes to 1530 which determines whether $\theta1$ is greater than $\theta2$. If so, at 1534, the start section is incremented and parameters associated with the terminus of the start section nearest or confronting the end section are determined. Otherwise, the end section is incremented and parameters of the terminus of the end section nearest or confronting the start section are determined. Operation then returns to 1508 for another iteration of the process until alignment at step 1514 is satisfied.

Having described the methods of FIGS. 21*a* and 21*e* in detail above, it is appropriate at this juncture to discuss further details with regard to scenarios 1-4 of Table 1. In FIG. 21*f*, scenario 1 path generation is diagrammatically indicated by the reference number 1600. Dotted circle 1432 continues to indicate a desired bend radius R. A vector V1, which can be referred to as an initial path direction, indicates the current direction/heading of the boring tool from a current location P1 situated on the desired bend radius which is normal to a vector V2 directed to a center C1 of circle 1432. A target endpoint P2 is illustrated along with a vector V_P1P2 extending from P1 to P2, such that a plane is defined by initial path direction V1 and target endpoint P2.

Since the coordinates of P1 and P2 are known, vector V_P1P2 is given as:

$$V\_P1P2 = P2 - P1 \qquad \text{Equation 1}$$

A vector V_perp extends into the plane of the figure normal to the plane of the figure and V1. A vector V_perp is perpendicular to and extends into the plane of the figure as given by the cross product (X in Equation 2) of V_P1P2 and V1:

$$V\_perp = V\_P1P2 \times V1 \qquad \text{Equation 2}$$

As noted, V_perp points into the page of FIG. 21f. To find the center of circle 1432 of radius R that passes through point P1, a vector V2 is created by rotating vector V1 by 90 degrees about an axis that is parallel to the axis defined by V_perp:

$$V2 = M(V\_perp, \pi/2) * V1 \qquad \text{Equation 3}$$

Where M(axis, θ) is a rotation operator (matrix) that creates a rotation by the angle θ about the vector axis. In this instance, θ is equal to 90 degrees. Vector V2 points towards center C1 of the circle, so the position of C1 is:

$$C1 = P1 + R * V2 \qquad \text{Equation 4}$$

Equation 4 assumes that vector V2 is a unit vector, so either vector V1 should be normalized to a length of one before the rotation or vector V2 should be normalized before applying Equation 4. Next, the vector V_P2C1 is created from point P2 to C1:

$$V\_P2C1 = C1 - P2 \qquad \text{Equation 5}$$

Referring to FIG. 21g in conjunction with FIG. 21f, the length of vector V_P2C1 is designated as h, as illustrated, from which it can be determined at step 1450 of FIG. 21a whether it is possible to reach end target point P2 with a bend radius of R. If h≥R, then it is possible, and the angles θ₃ and θ₄ are determined using:

$$\theta_3 = \sin^{-1}(R/h) \qquad \text{Equation 6}$$

$$\theta_4 = \cos^{-1}(R/h) \qquad \text{Equation 7}$$

On the other hand, if h<R, then it is necessary to reduce bend radius, R, and start over with Equation 1 at 1452 in FIG. 21a. Once an appropriate bend radius is found, the position of a point P3, can be determined by creating a vector V3 shown in FIG. 21g, where V3 is the negative of vector V_P2C1 in FIG. 21f normalized to a length of one. Next, vector V3 is rotated by −θ₄ about an axis parallel to V_perp to create a vector V4:

$$V4 = M(V\_perp, -\theta\_4) * V3 \qquad \text{Equation 8}$$

Because vector V4 points in the direction from center C1 of the circle to point P3, the position of point P3 is given by:

$$P3 = C1 + R * V4 \qquad \text{Equation 9}$$

Referring to FIG. 21h, the positions of points P1, P2, P3 and C1 have now all been determined such that equations to characterize the path from P1 to P2 passing through P3 can also be determined. In this way, any point on the path can be determined including, for example, a set of equally spaced apart points to serve as at least a portion of an underground plan. The position for an arbitrary point PA on the curved path between P1 and P3 can be generated by rotating a vector V_C1P1 by an angle per:

$$PA = C1 + M(V\_perp, \theta) * V\_C1P1 \qquad \text{Equation 10}$$

Where the angle of rotation, θ, characterizes the rotational movement from P1 to PA and where:

$$V\_C1P1 = P1 - C1 \qquad \text{Equation 11}$$

An arbitrary point PB, as illustrated in FIG. 21h, on a linear path LP between from point P3 to P2 can be generated using a line equation:

$$PB = P3 + t * V3 \qquad \text{Equation 12}$$

Where V3 is a unit vector in the direction of point P3 to point P2 with the parameter t set to target the desired point, PB. Any point on the line from P3 to P2 is determined by the value of t. It is noted that negative values of t would generate points to the left of P3 in the view of the figure. This concludes a complete description of scenario 1 path generation.

With regard to scenarios 2 and 3, a path between the current position and the target endpoint is determined as if both pitch and yaw of the target endpoint are undefined, as described above with respect to scenario 1. The pitch and yaw at the target endpoint (defined by the vector t*V3 between P3 and P2 in FIG. 21h) is determined and used to define the previously-undefined pitch or yaw variable. For example, if pitch is defined for point P2 in FIG. 21h, but yaw is not, the yaw of the vector from P3 to P2 in FIG. 21h is set as the defined yaw for input into the procedure for path extension with defined pitch and yaw in accordance with scenario 4.

With regard to scenario 4, reference is made to FIG. 21i which diagrammatically illustrates path generation in accordance with this scenario, generally indicated by the reference number 1700. The reader will recall that in scenario 4, the target pitch and the target yaw for arrival of the boring tool at the target endpoint, are both specified. Further, scenario 4 of Table 1 involves the iterative process described above in association with FIGS. 21c, 21d and 21e. The process for each increment of the iteration is essentially the same for an iterative extension of start section 1466 (FIGS. 21c and 21d) from the current point toward the target endpoint or of end section 1476, in a reverse direction, from the target endpoint toward the current point. The present description relates to an incremental movement from a point P1 to a point P2, where P1 can represent a forward endpoint of the start section or a rearward endpoint of the end section and P2 can represent a rearward endpoint of the start section or a forward endpoint of the end section, respectively. In either case, the procedure begins starting from position, P1, with a direction V1, as illustrated in FIG. 21i. The vector V1 can be represented in two equivalent manners, either by a standard 3-dimensional vector or by the parameters pitch and yaw, where pitch is the angle from horizontal and yaw is the angle (i.e., heading) in the horizontal plane. In FIG. 21i, vector V1 is shown as a 3D vector and labeled with a pitch, β1, and a yaw, γ1.

Extending either the start section or the end section under scenario 4 using an incrementally established circular path rotation to a next position, P3, with a path direction, V3, begins by determining a unit vector V2 pointing from P1 to P2:

$$V2 = (P2 - P1)/|P2 - P1| \qquad \text{Equation 13}$$

Where the straight brackets designate the magnitude (length) of the vector inside the brackets. Next, vector V_perp, perpendicular to the plane containing V1 and V2, is determined:

$$V\_perp = V1 \times V2 \qquad \text{Equation 14}$$

Referring to FIG. 21*j* in conjunction with FIG. 21*i*, V_perp points into the page or plane of the figure. To move an increment with the circular arc length, s, between P1 and next point, P3, a rotational angle, α in FIG. 21*j*, is determined between V1, the direction at point P1, and V3, the direction at point P3, as:

$$\alpha = s/R \qquad \text{Equation 15}$$

Where R is the desired bend radius. The direction, V3, at point P3, is then given by:

$$V3 = M(V\_perp, \alpha) * V1 \qquad \text{Equation 16}$$

A pitch, β3, and a yaw, γ3, of vector V3 are determined, using:

$$\beta 3 = -\tan^{-1}\left(\frac{V3Z}{\sqrt{V3X^2 + V3Y^2}}\right) \qquad \text{Equation 17}$$

and $$\gamma 3 = \tan^{-1}(V3Y, V3X) \qquad \text{Equation 18}$$

Where V3X, V3Y, and V3Z are the Cartesian coordinates for vector V3. In Equation 18, the inverse tangent function is the conventional atan 2 function, defined over the range −180 to +180 degrees. Given the pitch and yaw at point P3 from Equations 17 and 18, the position of point P3 is determined using:

$$P3X = P1X + s*\cos(\langle \beta 3, \beta 1 \rangle)*\cos(\langle \gamma 3, \gamma 1 \rangle) \qquad \text{Equation 19a}$$

$$P3Y = P1Y + s*\cos(\langle \beta 3, \beta 1 \rangle)*\sin(\langle \gamma 3, \gamma 1 \rangle) \qquad \text{Equation 19b}$$

$$P3Z = P1Z - s*\sin(\langle \beta 3, \beta 1 \rangle) \qquad \text{Equation 19c}$$

In Equations 19, the angular brackets (< >) indicate the mean of the two angles inside the brackets. Having completed an iteration, the forward heading at the forward end of the start section can be compared to the reverse heading of the end section at its rearward end to establish whether the alignment is sufficient to linearly connect the start section to the end section, as described above.

Applicants note that the techniques brought to light herein for purposes of planning to maximize linear drilling are not limited to implementation in the planning tool of the present disclosure. Applicants submit that these techniques can be implemented as part of any system and/or device that performs planning of an underground bore, while achieving the benefits described.

FIG. 22 is a diagrammatic view, in elevation, of a system 1800 (also see FIG. 7) which includes planning tool 10 and drill rig 402 for moving boring tool 404 through the ground. It is again noted that there is no requirement for drill rig 402 to be present during the development of the underground plan, but the drill rig has been shown for purposes of completeness. FIG. 21 further illustrates a plurality of trackers 1804*a*-1804*d*, which may be referred to collectively by the reference number 1804, that are arranged along a path 1808 on the surface of the ground. Each tracker is configured for tracking boring tool 404 by receiving a dipole electromagnetic locating field 1810 that is emitted by a transmitter that is housed in boring tool 404. One example of a competing system is seen in U.S. Published Patent Application no. 2017/0022799, which is incorporated by reference, although the system described therein has no capability to perform planning based on surface contour or to provide guidance in tracker placement.

Based on reception of the locating field, each tracker can generate steering commands for guiding the boring tool on an underground path 1812, shown as a dashed line, directly below the trackers from an entry point 1814 to a target T. Steering commands for drilling guidance can be produced, for example, as discussed in commonly owned U.S. Pat. Nos. 6,727,704, 8,381,836 and 9,540,879, each of which is hereby incorporated by reference. Trackers 1804 can be configured for wireless communication with drill rig 402 in any suitable manner. For example, each tracker can be configured with a telemetry transceiver to serve as a repeater to relay signals to immediately adjacent trackers. Signals can be repeated responsive to a tracker being active. That is, a particular tracker can be active when the boring tool transmitter is within range of that particular tracker. For example, if tracker 1804*c* is active, tracker 1804*b* can receive a signal 1816 from tracker 1804*c* and retransmit a signal 1818 to tracker 1804*a*. As another example, each tracker can be configured as a node of a mesh network with drill rig 402 serving as an ultimate destination for the signals. As still another example, each tracker can be configured with telemetry to communicate directly with the drill rig.

Still referring to FIG. 22, it is noted that operator 408 can utilize planning tool 10 to measure the surface contour of path 1808 in the manner described above with regard to FIGS. 7 and 8. In addition to measuring the surface contour, the planning tool can instruct the operator when to place one of trackers 1804 on the path. For a path that is essentially a straight and reasonably level, the first tracker can be spaced from the drill rig by a predetermined distance with subsequent trackers laid out at the same predetermined distance from one another based on distance measurements made by planning tool 10. This predetermined distance can be selected, for example, to insure that the tracker being placed is within receiving range from the drill rig and or an adjacent tracker on the path. In the present example, tracker 1804*a* is at a predetermined distance from the drill rig while tracker 1804*b* has been placed based on the surface contour of path 1808. Because the contour of path 1808 is losing elevation, line of sight communication may be lost if the path continues to drop such that tracker 1804*b* is placed even lower than the illustrated position. Accordingly, in view of the surface contour, planning tool 10 notifies the operator to place tracker 1804*b* so that line of sight communication will not be lost with tracker 1804*a*. As shown in an inset view within a dashed circle, app 384 has issued a notification 1820 for the operator to place tracker 1804*c* on path 1808. In response, the operator has positioned tracker 1804*c* adjacent to the primary wheel of planning tool 10.

In an embodiment, trackers can be placed at positions designated by the planning tool operator. For example, a tracker can be placed directly above a utility. In this way, locating near each utility can be enhanced. In addition, a target depth can be specified for the boring tool at the tracker such that the boring tool avoids the utility. Tracker 1804*c* is shown placed directly above a utility 1830, which is shown in phantom as a dashed circle. The location of the utility can be known in advance by the operator of the planning tool, for example, by being potholed. The drilling system can then notify the operator of the drill rig to use extra caution when tracker 1804*c* is active due to the presence of the utility.

Based on this example, a user can place a tracker at any location on path 1808 as the planning tool is rolled and specify a depth for the boring tool at that tracker. For instance, the operator may want to reach a particular depth at a specific distance from the drill rig and, therefore, places a tracker at that position. The operator utilizes the planning tool to assign the particular depth for the boring tool to that tracker.

Once the planning tool reaches a point directly above target T, the operator places tracker 1804*d* (shown in phantom using dashed lines) on the path directly above the target and specifies a depth $D_T$. It is noted that a depth can be specified by the operator for each tracker, indicating the depth at which the boring tool should pass under each tracker, although this is not a requirement. Planning tool 10 can develop underground plan 1812 based on the surface contour of path 1808, entry position 1814 and target position T. In an embodiment wherein the planning tool includes a precision GPS, the indications to place the trackers can be made while walking in the inbound direction, rather than during the outbound walk. During this inbound walk, app 384 can indicate to the operator whether the current position of the planning tool is to the left, to the right or on the outbound path to insure placement of the trackers on the path. In still another embodiment, the operator can designate utilities on both the inbound and outbound walks such that the underground plan can be developed using both positions of each utility to increase confidence in the final determined location of each utility. The latter can be an average of the two positions (outbound and inbound) for each utility.

FIG. 23 is a diagrammatic view, in elevation, of a drilling region 1900 shown here for purposes of illustrating further details with regard to the use of planning tool 10 in the context of a utility corridor 1904, indicated by dashed lines, and having an upper limit 1910, at 4 feet below a surface 1912 of the ground and a lower limit 1914 at 8 feet below the surface of the ground. Drill string 1920 is shown attached to boring tool 404. In the present example, it is assumed that boring tool 404 has already arrived at the illustrated position directly below a surface point 1930 within the utility corridor, which the operator has designated as an initial waypoint along an intermediate segment, and the intention of operator 408 is to use the planning tool to formulate the intermediate segment from the current position of the boring tool to an inground depth point 1934 directly beneath a surface point 1936 which the operator has designated as an end waypoint of the intermediate segment that is also within utility corridor 1904. Smart device 96 is shown in an inset view within a dashed circle 1940 in which app 384 is issuing a warning 1944 that there is a utility corridor violation. In particular, the boring tool will be unable to descend, even bent at its tightest minimum bend radius 1946, at a rate that is sufficient to remain below upper limit 1910 of the utility corridor. In other words, due to the starting position of the intermediate segment and constraints imposed by the drill string, it is not possible to drill the intermediate segment that the operator is requesting without violating the utility corridor. In order to cure this difficulty, it would be required to retract the boring tool using the drill string and re-drill so that the boring tool is at sufficient depth below waypoint 1930 at the start of the intermediate segment.

Referring to FIGS. 1 and 2, planning tool 10, in an embodiment, can include what may be referred to as a tape measure mode wherein app 384 (FIG. 6*a*) displays distance traveled by the planning tool in a way that resembles the operation of a prior art measuring wheel. During this mode, reverse rotation of the primary wheel is subtracted from overall forward progress of the planning tool.

The foregoing description of the invention has been presented for purposes of illustration and description. It is not intended to be exhaustive or to limit the invention to the precise form or forms disclosed, and other modifications and variations may be possible in light of the above teachings wherein those of skill in the art will recognize certain modifications, permutations, additions and sub-combinations thereof.

What is claimed is:

1. A planning tool as part of a system for horizontal directional drilling in which a drill rig advances a boring tool in a forward direction through the ground using a drill string that extends from the drill rig to the boring tool, said planning tool comprising:
   one or more wheels for rolling on a surface of the ground along a path in a reverse direction, opposite the forward direction, beginning from a predetermined position and responsive to movement by an operator;
   an encoder for generating an encoder output responsive to the rolling of one of the wheels in the reverse direction;
   an accelerometer including at least one measurement axis for generating an accelerometer output during said rolling in the reverse direction that characterizes a pitch orientation of the planning tool; and
   a processor for generating a setback position for the drill rig on the path in the reverse direction from the predetermined position based on a surface contour of the path in the reverse direction as characterized by the encoder output and the accelerometer output.

2. The planning tool of claim 1 wherein the predetermined position is an entry position for the boring tool to penetrate the surface of the ground.

3. The planning tool of claim 1 wherein the predetermined position designates an inground position directly therebelow at a specified depth and through which the boring tool is intended to pass during drilling.

4. The planning tool of claim 3 wherein the processor is further configured to determine an entry position for the boring tool to enter the ground between the setback position and the predetermined position at least based on the surface contour of the path.

\* \* \* \* \*